United States Patent
Lee et al.

(10) Patent No.: US 7,369,211 B2
(45) Date of Patent: May 6, 2008

(54) METHOD AND APPARATUS FOR FORMING A SEALING MEMBER FOR A DISPLAY DEVICE

(75) Inventors: Won-Kyu Lee, Seongnam-si (KR); Hyung-Guel Kim, Yongin-si (KR); Jun-Ho Song, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 229 days.

(21) Appl. No.: 10/945,478

(22) Filed: Sep. 20, 2004

(65) Prior Publication Data

US 2005/0151919 A1   Jul. 14, 2005

(30) Foreign Application Priority Data

Jan. 9, 2004   (KR) ................ 10-2004-0001514

(51) Int. Cl.
*G02F 1/1339* (2006.01)
(52) U.S. Cl. .................... 349/190; 349/153
(58) Field of Classification Search ........... 349/153, 349/190
See application file for complete search history.

(56) References Cited

U.S. PATENT DOCUMENTS 5,985,069 A * 11/1999 Kawabe et al. ............ 156/109
6,144,438 A * 11/2000 Izumi ........................ 349/155
7,075,612 B2 * 7/2006 Park et al. .................. 349/153
2002/0063836 A1 * 5/2002 Oku et al. .................. 349/153
2005/0264748 A1 * 12/2005 Imayama et al. ........... 349/153

FOREIGN PATENT DOCUMENTS

| JP | 11-271783 | 10/1999 |
| JP | 2001-125115 | 5/2001 |
| JP | 2003-344863 | 12/2003 |

OTHER PUBLICATIONS

European Search Report; Application No. EP 05 25 0035; Dated Apr. 19, 2005.

* cited by examiner

*Primary Examiner*—Andrew Schechter
*Assistant Examiner*—Nathanael Briggs
(74) *Attorney, Agent, or Firm*—Cantor Colburn LLP

(57) ABSTRACT

A method and apparatus for forming a sealing member includes forming a first sealing part to surround one portion of a display area, the display area including a pixel, and forming a second sealing part to surround a remaining portion of the display area and to intersect ends defining the second sealing part with corresponding ends defining the first sealing part. Thus, a time needed to form the first and second sealing member may be reduced, thereby reducing an entire process time to manufacture the display apparatus. Further, an area needed to form the sealing member may be reduced, thereby enhancing productivity of the display apparatus.

10 Claims, 33 Drawing Sheets

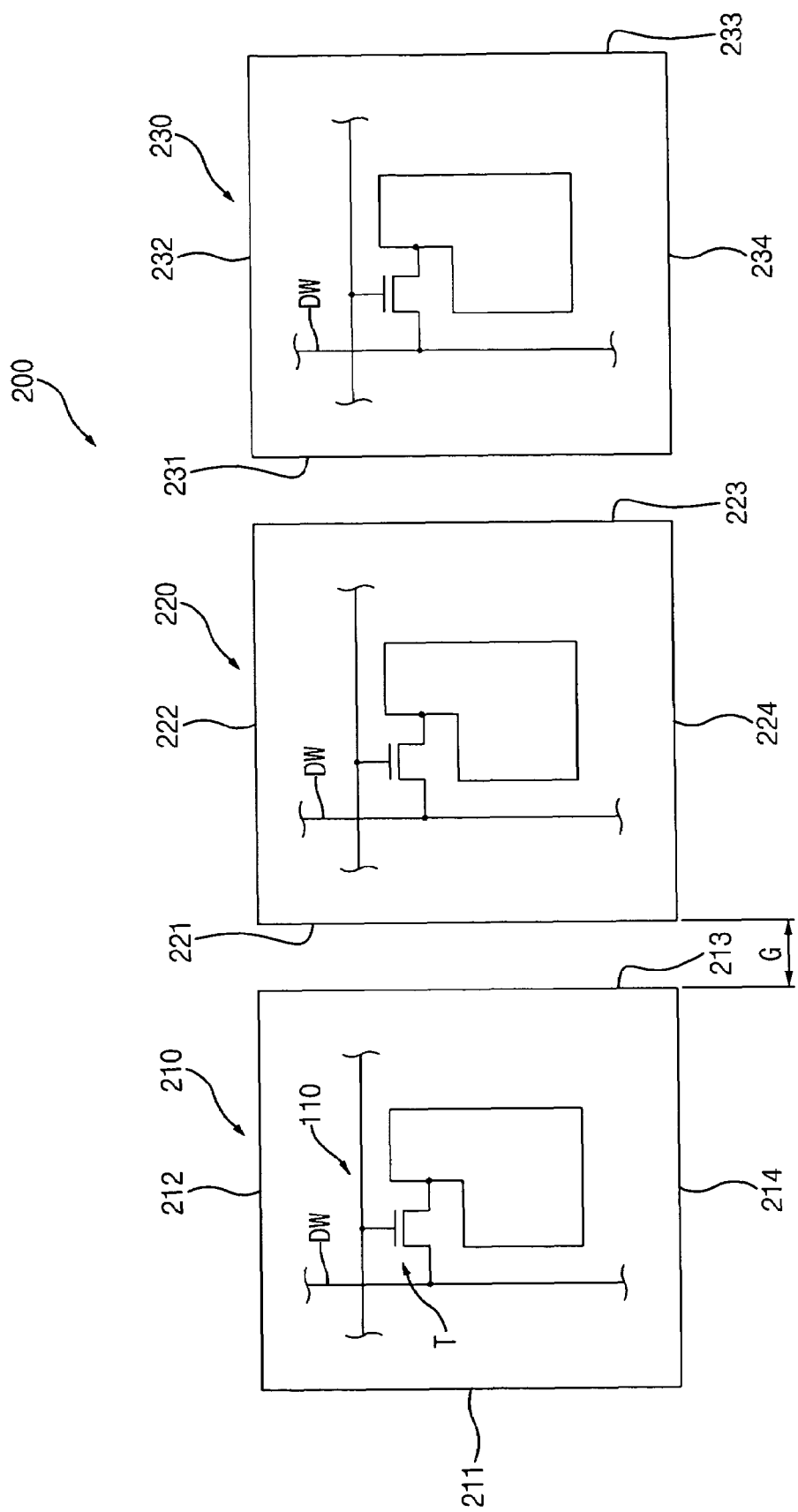

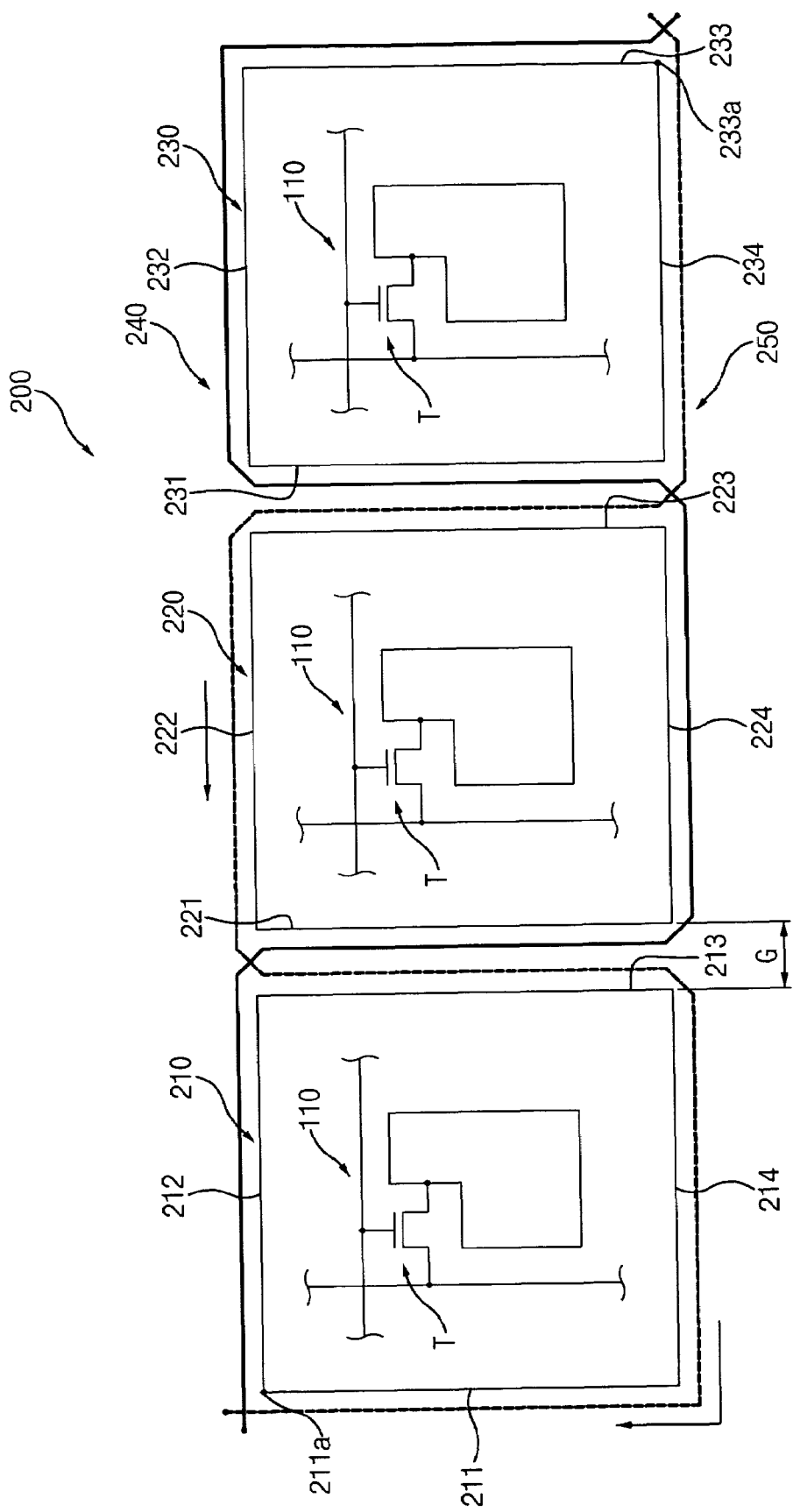

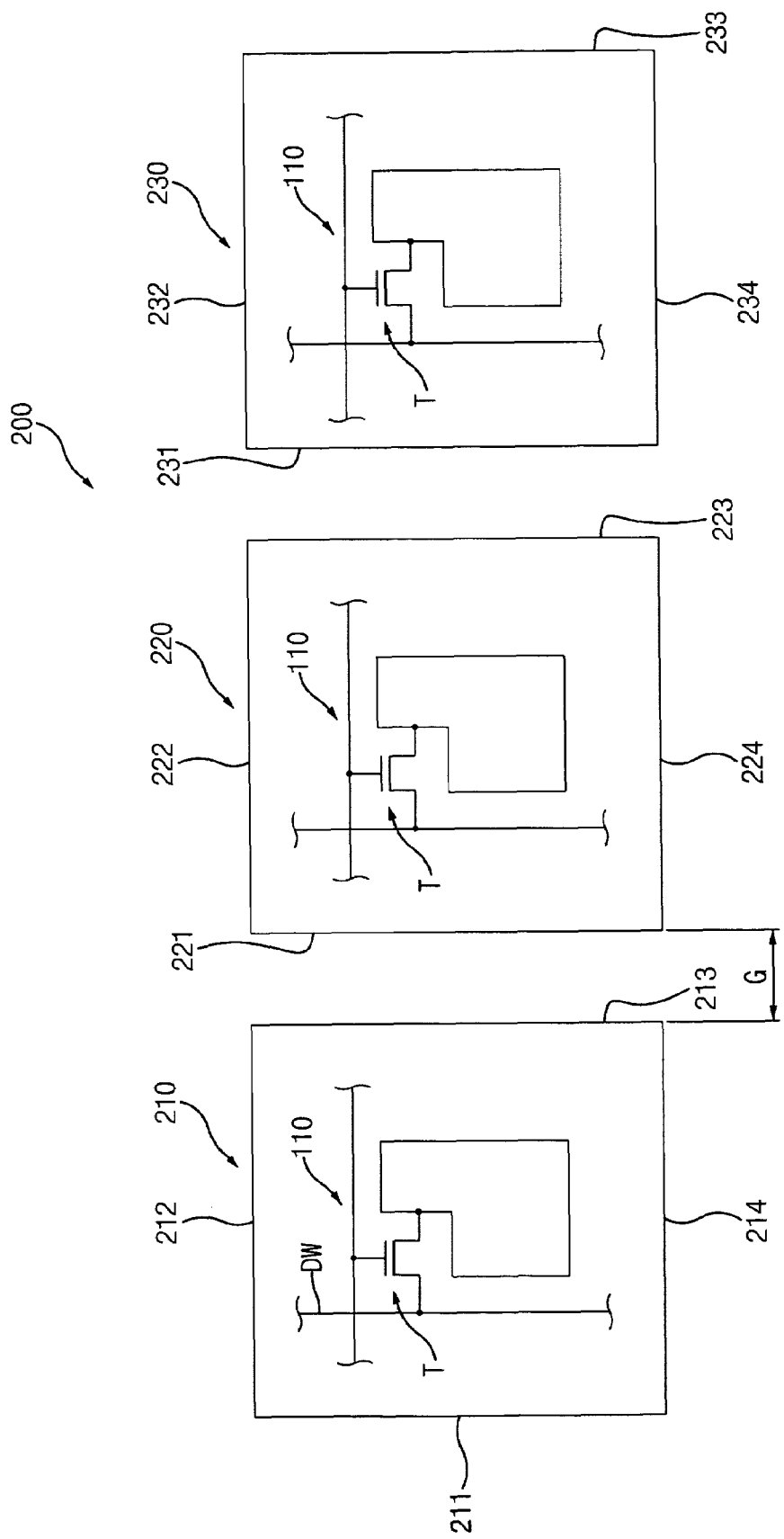

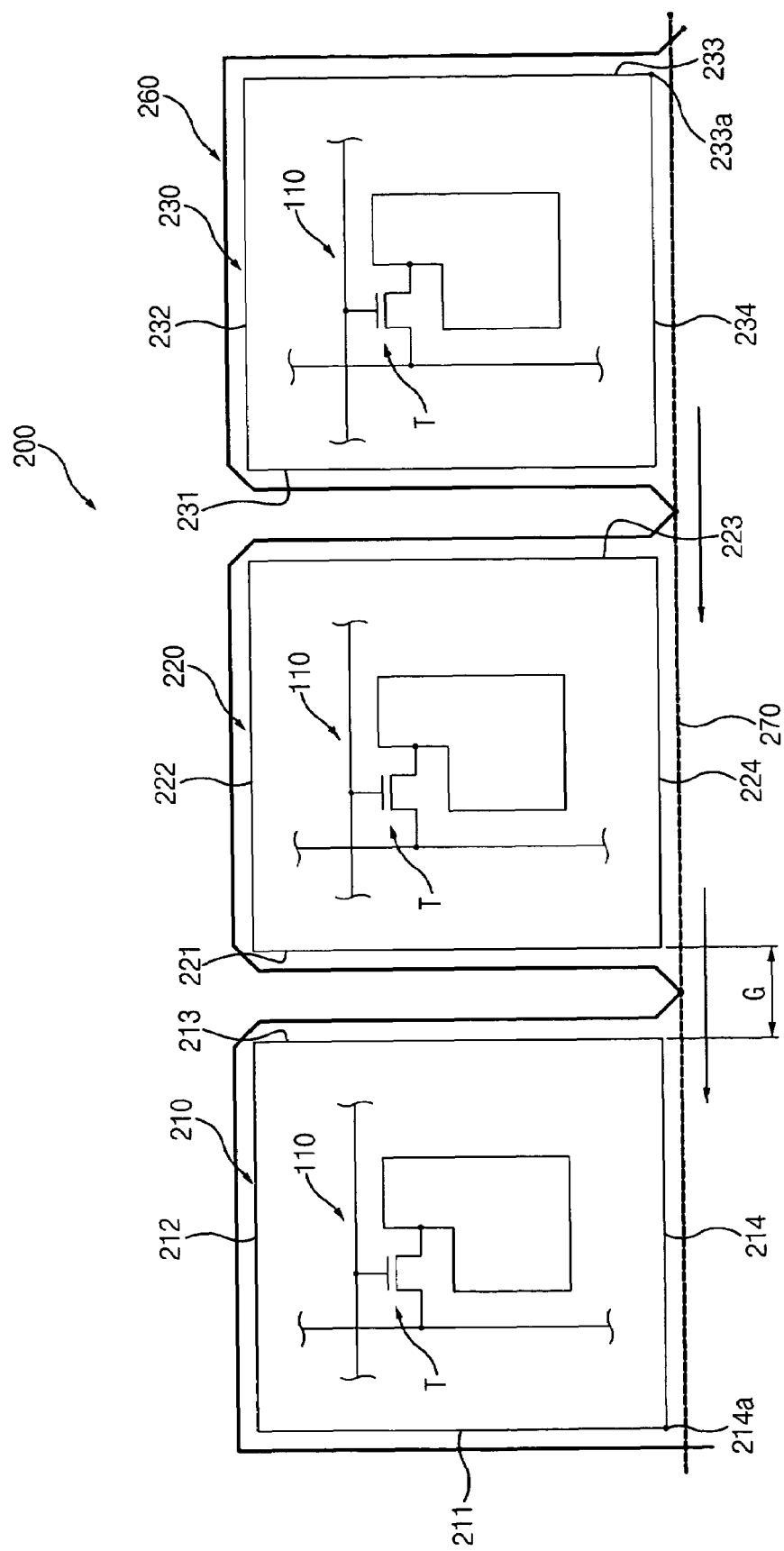

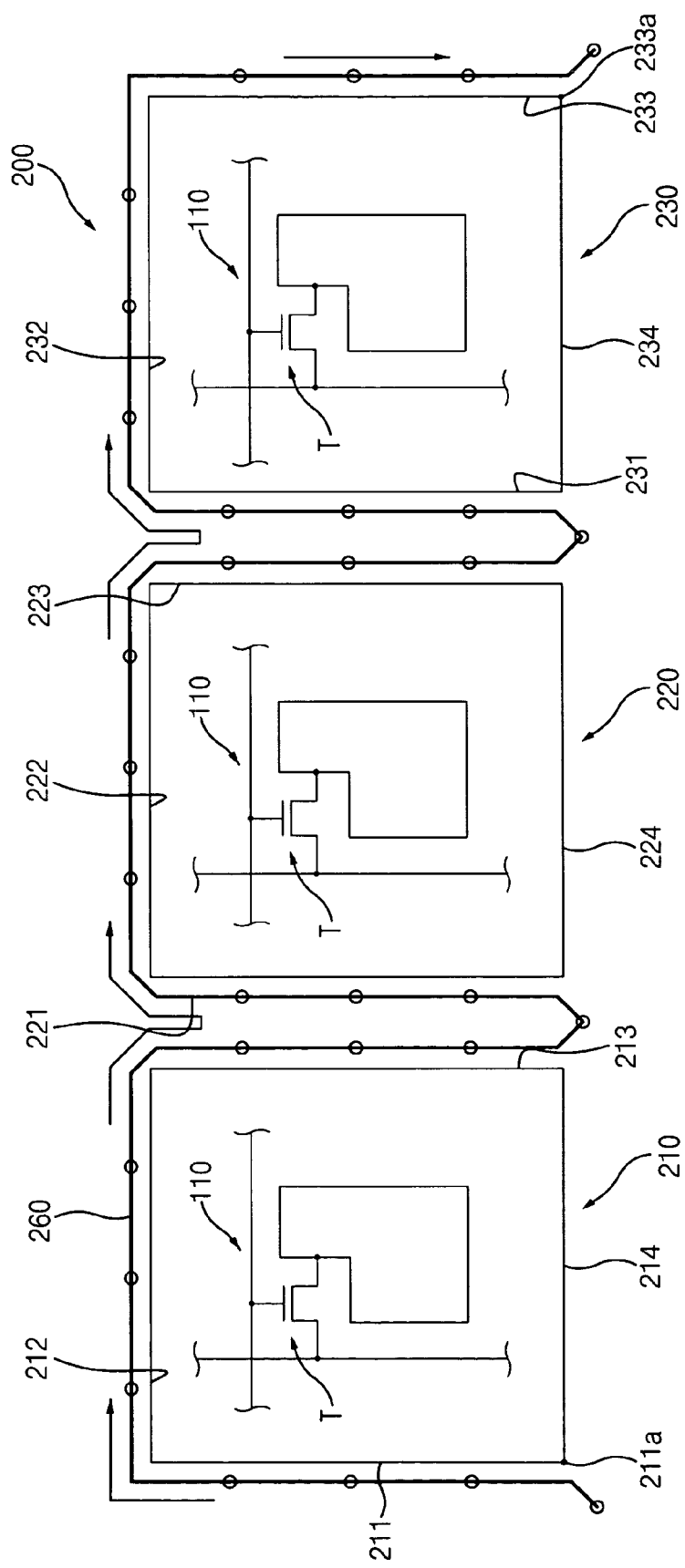

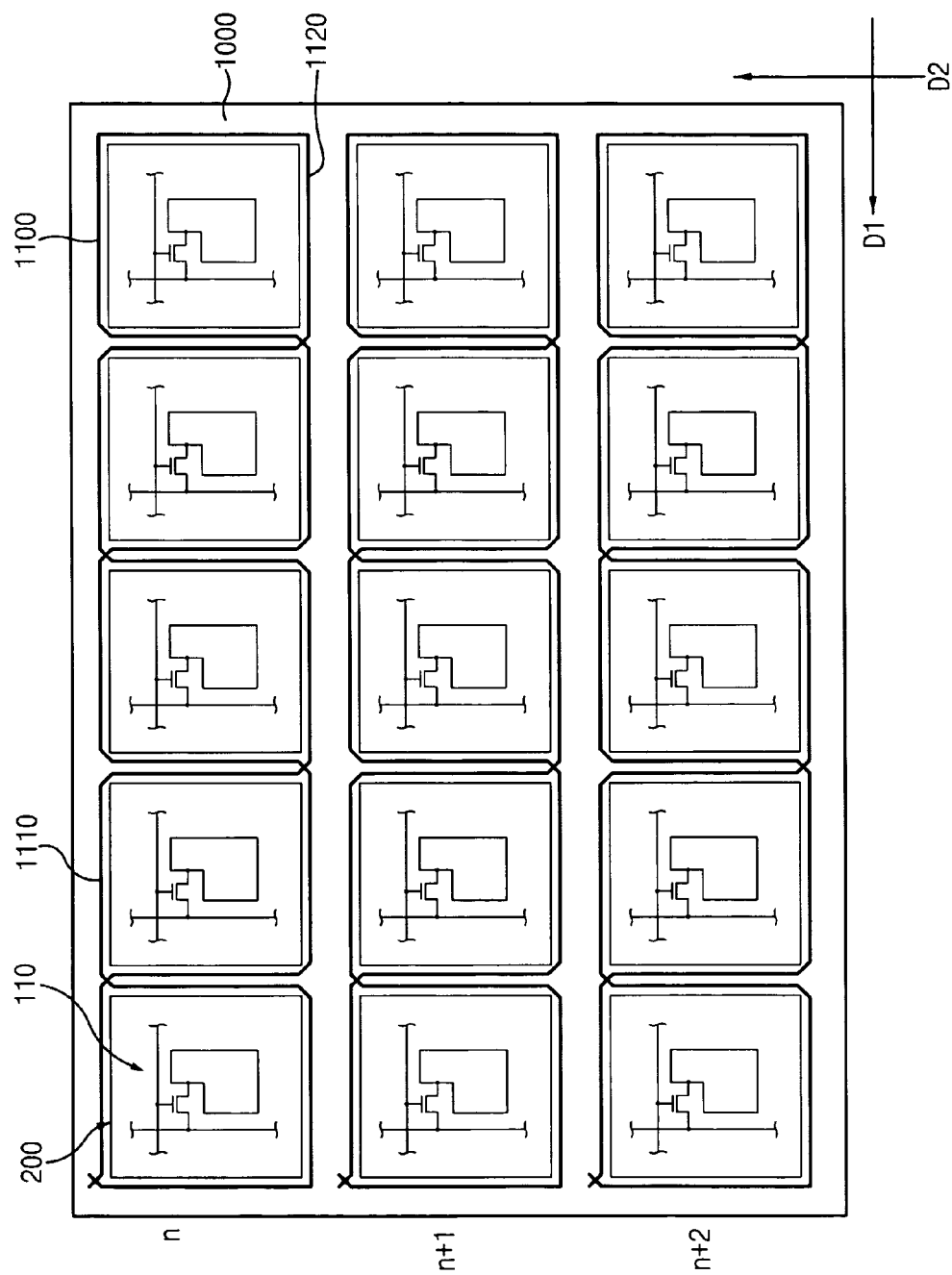

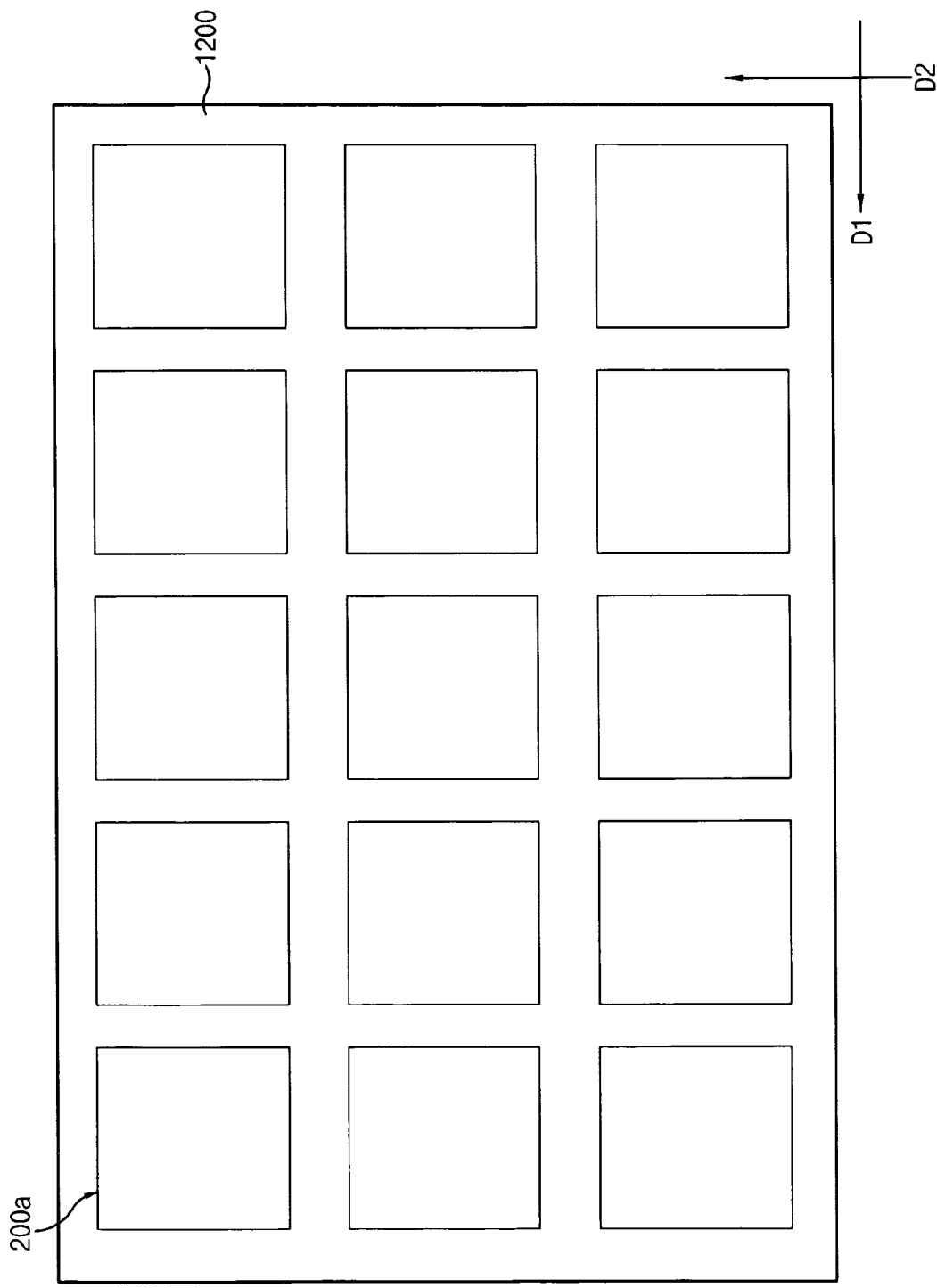

METHOD AND APPARATUS FOR FORMING A SEALING MEMBER FOR A DISPLAY DEVICE

CROSS-REFERENCE TO RELATED APPLICATION

This application relies for priority upon Korean Patent Application No. 2004-1514 filed on Jan. 9, 2004, the contents of which are herein incorporated by reference in its entirety

BACKGROUND OF THE INVENTION

1. Field of the Invention

The present invention relates to a method and apparatus for forming a sealing member for a display apparatus, and more particularly to an apparatus and method of forming a sealing member capable of enhancing a number of display panels.

2. Description of the Related Art

In order to visually confirm information processed in an information-processing device, a display apparatus is used as an interface. Various display apparatuses, for example, such as a cathode ray tube (CRT) display apparatus, a liquid crystal display (LCD) apparatus, a plasma display panel (PDP), an organic electro-luminescence display (EL) apparatus and so on, may be used as the interface.

The LCD apparatus displays an image using various characteristics, for example, such as twist, spray, band, etc., of liquid crystal to which an electric field is applied.

The LCD apparatus includes a pair of substrates, electrodes, a liquid crystal layer and a sealing member. The electrodes are formed at the substrates facing each other, and each of the electrodes receives a different voltage from each other, thereby generating the electric field between the substrates. The liquid crystal layer and the sealing member are disposed between the substrates. The sealing member may maintain a gap between the substrates and prevent leakage of the liquid crystal.

In order to inject the liquid crystal into the gap between the substrates, the scaling member is partially opened, or remains in a closed loop configuration during injection of the liquid crystal. More specifically, when the LCD apparatus has the sealing member partially opened, the liquid crystal is injected into the gap between the substrates using a vacuum injection method. When the LCD apparatus has the sealing member in a closed loop configuration, the liquid crystal is provided between the substrates using a dropping method.

Since the vacuum injection method involves a complex process relative to that of the dropping method, the vacuum injection method has not been widely used.

However, when applying the dropping method, the sealing member may not be successively formed over a plurality of LCD apparatuses because the dropping method coats the sealing member having a band shape on the substrates in the closed loop configuration. Furthermore, it is difficult to make the closed loop configuration in which ends defining the closed loop accurately meet and to successively form additional closed loops.

As a result, the dropping method increases a processing time needed to manufacture a plurality of LCD apparatuses, thus lowering productivity. According, a method and apparatus to increase productivity by decreasing the processing time needed to manufacture a plurality of LCD apparatuses are desired.

BRIEF SUMMARY OF THE INVENTION

The present invention provides a method and apparatus for forming a sealing member, capable of reducing a processing time needed to form the sealing member having a closed loop.

The present invention also provides a display apparatus having the sealing member formed by using the above method for forming a sealing member and provides a method sufficient for manufacturing the display apparatus.

According to one aspect of the present invention, the sealing member extended in the first direction is applied to portions of the display areas, and the sealing member extended in the second direction is applied remaining portions of the display areas, thereby reducing the processing time needed to form the sealing member.

According to another aspect of the present invention, a method for forming a sealing member is disclosed. The method includes forming a first sealing part to surround one portion of a display area, the display area including a pixel, and forming a second sealing part to surround a remaining portion of the display area and to intersect ends defining the second sealing part with corresponding ends defining the first sealing part.

According to still another aspect of the present invention, an apparatus for forming a sealing member includes a sealing member coating unit that includes a dispenser configured to discharge a sealing member over a substrate and a driving unit to drive the dispenser. The dispenser forms a first sealing part to surround one portion of a display area defined on the substrate and forms a second sealing part to surround a remaining portion of the display area. The dispenser is configured to intersect ends defining the second sealing part with corresponding ends defining the first sealing part. A control unit controls the driving unit.

According to still another aspect of the present invention, a display apparatus includes a first substrate that includes a first display area and a first peripheral area surrounding the first display area. A second substrate includes a second display area facing the first display area, the second substrate includes a second peripheral area facing the first peripheral area. A sealing member is disposed between the first and second substrates. The sealing member includes a first sealing portion that surrounds the first display area along the first peripheral area, a first connection portion that extends from a first end defining the first sealing portion, the first connection portion extends to an exterior of the first display area at a connection portion, and a second connection portion that extends from a second end defining the first sealing portion, the second sealing portion extends to the exterior of the first display area and to the connection portion.

According to yet another aspect of the present invention, a method for manufacturing a display apparatus includes forming a first display area on a first substrate. A portion of the first display area is surrounded with a sealing material to form a first sealing part. A remaining portion of the first display area is surrounded with the sealing material to form a second sealing part and to intersect ends defining the second sealing part with corresponding ends defining the first sealing part. A second display area is formed on a second substrate to face the first display area. Liquid crystal is arranged on an area formed by the first and second sealing parts. The first and second substrates are assembled with the first and second sealing parts to form an LCD unit cell and the formed LCD unit defined by the first and second sealing parts is cut.

BRIEF DESCRIPTION OF THE DRAWINGS

The above and other advantages of the present invention will become readily apparent by reference to the following detailed description when considered in conjunction with the accompanying drawings wherein:

FIG. 4A is a plan view showing a plurality of display areas sealed by a method of forming a sealing member according to a fourth exemplary embodiment of the present invention;

FIG. 4C is a plan view showing a remaining portion of the display area sealed by a second sealing part shown in FIG. 4B;

FIG. 5A is a plan view showing a plurality of display areas sealed by a method of forming a sealing member according to a fifth exemplary embodiment of the present invention;

FIG. 5C is a plan view showing a remaining portion of the display area sealed by a second sealing part shown in FIG. 5B;

FIGS. 11A and 11B are plan views showing a first sealing part and a second sealing part applied to a plurality of display areas by a sealing member forming apparatus according to the ninth exemplary embodiment of the present invention;

FIG. 21A is a plan view illustrating a first method of forming a sealing member onto a first mother substrate according to a sixteenth exemplary embodiment of the present invention;

FIG. 21C is a plan view showing a second mother substrate according to the sixteenth exemplary embodiment of the present invention;

DESCRIPTION OF THE PREFERRED EMBODIMENT

In the detailed description that follows, terms identified therein are defined as follows. A display area is an area on which an image is displayed. The display area may have various shapes, including, but not limited to, for example, such as a circle shape, a triangular shape, a rectangular shape, a polygonal shape and the like. In an exemplary embodiment, the display area is described having a rectangular shape. A sealing part that surrounds the display area may include a sealing member having a band shape or a string shape.

Method of Forming a Sealing Member

Embodiment 1

Figure 1A:
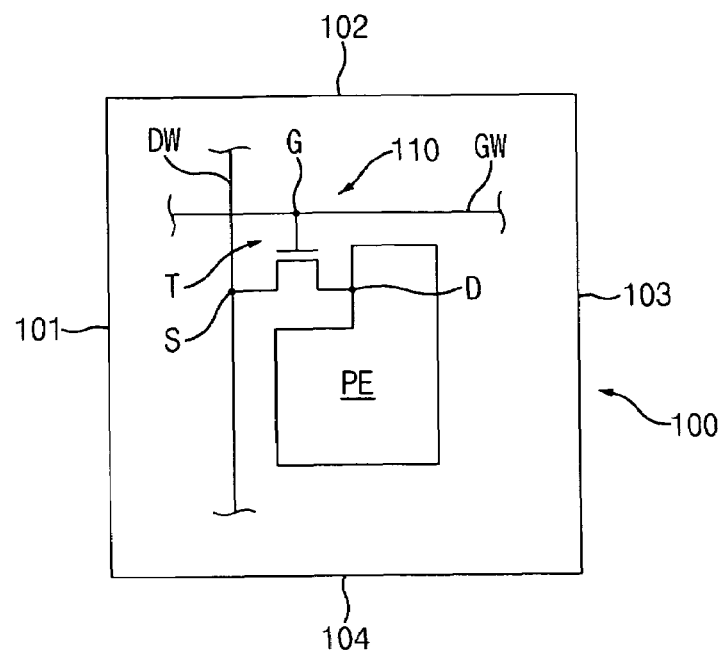
FIG. 1A is a plan view showing a display area sealed by a method of forming a sealing member according to a first exemplary embodiment of the present invention.

FIG. 1A is a plan view showing a display area sealed by a method of forming a sealing member according to a first exemplary embodiment of the present invention.

Referring to FIG. 1A, a display area 100 has a rectangular shape, so that the display area 100 includes a first edge 101, a second edge 102, a third edge 103 and a fourth edge 104. The first and second edges 101 and 102 face the third and fourth edges 103 and 104, respectively.

A pixel 110 that displays an image is formed in the display area 100. Although not shown in FIG. 1A, a plurality of pixels may be formed in the display area 100 according to a resolution of the displayed image. For example, a display area having a resolution of 640×480 has 640×480×3 pixels.

The pixel 110 includes a pixel electrode PE, a thin film transistor T, a gate signal line GW and a data signal line DW.

The pixel electrode PE is electrically connected to a drain electrode D of the thin film transistor T, the gate signal line GW is electrically connected to a gate electrode G of the thin film transistor T, and the data signal line DW is electrically connected to a source electrode S of the thin film transistor T.

The pixel 110 described above may be applied to various display apparatus, for example, such as a liquid crystal display (LCD), a plasma display panel (PDP) or the like. The display area 100 having the pixel 110 is sealed by a sealing member.

In the case of the LCD apparatus, the sealing member prevents leakage of liquid crystal injected into the display area 100. In the case of the PDP, the sealing member prevents operation gas that generates plasma, for example, such as neon (Ne), argon (Ar), and the like, from leaking.

Figure 1B:
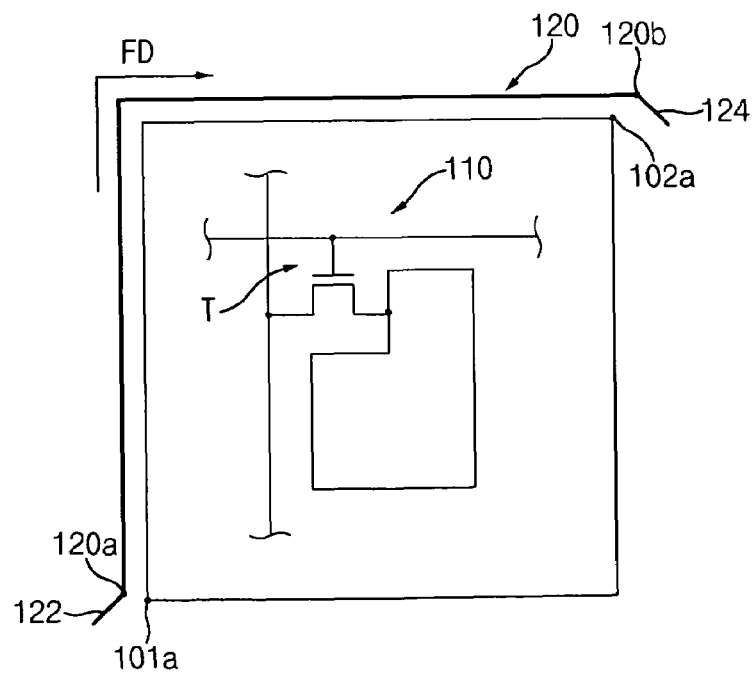
FIGS. 1B and 1C are plan views showing the display area sealed by a first sealing part and a second sealing part shown in FIG. 1A.
Figure 1C:
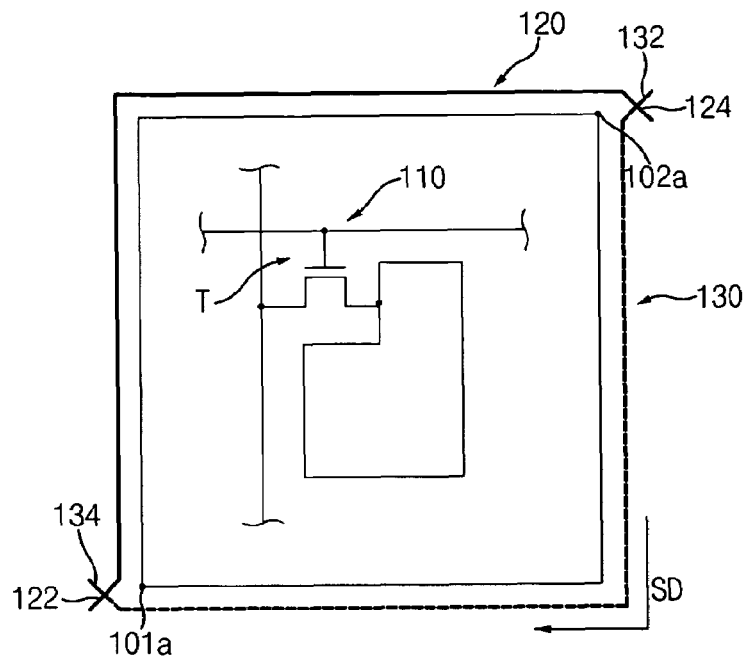

FIGS. 1B and 1C are plan views of FIG. 1A showing the display area sealed by a first sealing part.

Referring to FIG. 1B, in order to apply a sealing material to a portion of the display area 100, the sealing material having the band shape or the string shape is formed along a first direction FD. That is, the sealing material is formed proximate a corner where the first and fourth edges 101 and 104 meet with each other and the sealing member extends to a corner where the second and third edges 102 and 103 meet with each other. It is contemplated that the sealing material may include an optical sclerotic material or a thermal sclerotic material.

A first connection portion 122 and a second connection portion 124 are formed with a first sealing part 120. The first connection portion 122 extends outwardly at an angle of about 45 degrees from a first end 120*a* of the first sealing part 120 with respect to the first edge 101. A second connection portion 124 extends outwardly at an angle of about 45 degrees from a second end 120*b* of the first sealing part 120 with respect to the second edge 102. Both connection portions 122, 124 extend toward the fourth edge 104.

Referring to FIG. 1C, in order to completely seal the display area 100, the sealing material having the band shape or the string shape is formed in a second direction SD opposite the first direction FD relative to corresponding parallel edges 101, 102, 103, and 104. The sealing material is applied to the third and fourth edges 103 and 104, so that the second sealing part 130 is formed along the third and fourth edges 103 and 104.

The second sealing part 130 includes a third connection portion 132 and a fourth connection portion 134.

The third and fourth connection portions 132 and 134 intersect the second and first connection portions 124 and 122, respectively.

In this exemplary embodiment, the third and second connection portions 132 and 124 intersect each other in an X-shape, and the fourth and first connection portions 134 and 124 also intersect with each other in the X-shape.

Thus, the display area 100 is surrounded by means of the first and second sealing parts 120 and 130 defining a closed loop.

As described above, the first sealing part 120 is formed in the first direction FD so as to apply the sealing material to the portion of the display area 100, and the second sealing part 130 is formed in the second direction SD opposite the first direction FD so as to apply the sealing material to the remaining portion of the display area 100. The first and second sealing parts 120 and 130 intersect each other, thereby reducing a process time needed to seal the display area 100 using the sealing material. It will be recognized that although the second sealing part 130 has been described above as being initiated in a corner 102*a* diametrically opposite a corner 101*a* from which sealing part 120 is initiated from, that it is contemplated that second sealing part 130 may also initiate from corner 101*a* forming second sealing part 130 in the second direction SD.

Embodiment 2

Figure 2A:
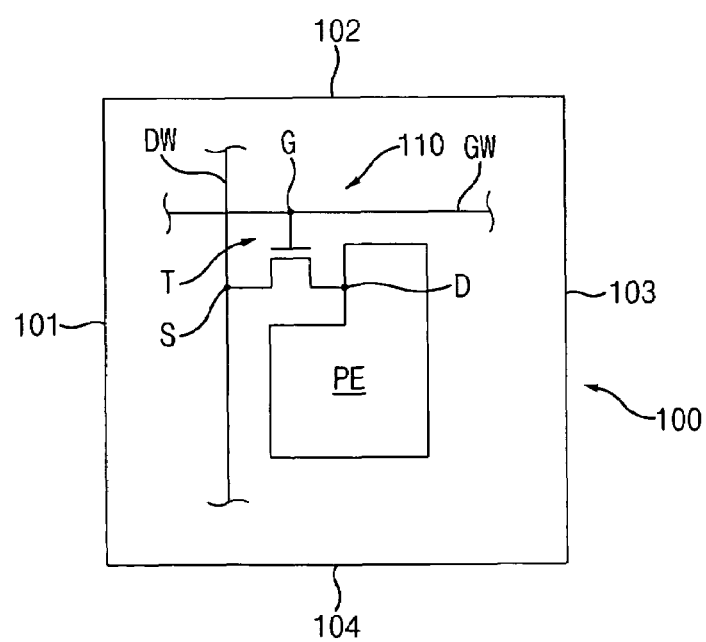
FIG. 2A is a plan view showing a display area sealed by a method of forming a sealing member according to a second exemplary embodiment of the present invention.
Figure 2B:
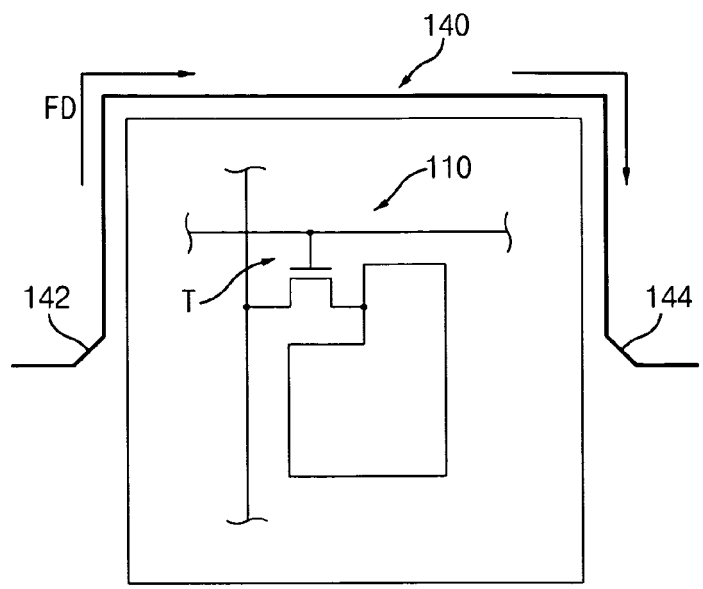
FIGS. 2B and 2C are plan views showing the display area sealed by a first sealing part and a second sealing part shown in FIG. 2A.
Figure 2C:
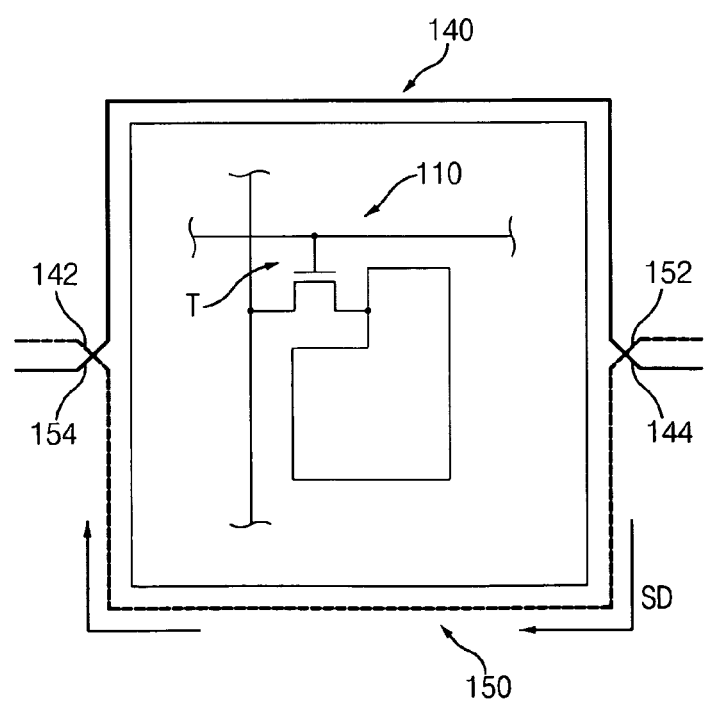

FIG. 2A is a plan view showing a display area sealed by a forming method of a sealing member according to a second exemplary embodiment of the present invention. FIGS. 2B and 2C are plan views showing the display area sealed by a first sealing part and a second sealing part shown in FIG. 2A. In this exemplary embodiment, the same reference numerals denote the same elements in FIG. 1A, and thus the detailed descriptions of the same elements will be omitted.

Referring to FIG. 2B, a sealing material having a band shape or a string shape is formed along a first direction FD. The sealing material is formed from a center portion of a first edge 101 of a display area 100 shown in FIG. 2A to a center portion of a third edge 103. Thus, the first sealing part 140 includes the sealing material applied to the portion of the first edge 101, the second edge 102 and the portion of third edge 103.

The first sealing part 140 includes a first connection portion 142 and a second connection portion 144, and the first and second connection portions 142 and 144 are formed when the first sealing part 140 is formed.

The first connection portion 142 is outwardly bent in an angle of about 45 degrees with respect to the first edge 101, and the second connection portion 144 is outwardly bent in an angle of about 45 degrees with respect to the third edge 103. Both connection portions 142, 144 are defined having ends where first sealing part 140 extends in a direction parallel to edges 102 and 104.

Referring to FIG. 2C, a sealing material having a band shape or a string shape is formed along a second direction SD opposite to the first direction FD. The sealing material is formed from the center portion of the first edge 101 of the display area 100 shown in FIG. 2A to the center portion of the third edge 103. Thus, the second sealing part 150 includes the sealing material applied to the portion of the first edge 101, the fourth edge 104 and the portion of the third edge 103.

The second sealing part 150 includes a third connection portion 152 and a fourth connection portion 154, and the third and fourth connection portions 152 and 154 are formed with the second sealing part 150 is formed.

The third connection portion 152 is outwardly bent in an angle of about 45 degrees with respect to the first edge 101, and the fourth connection portion 154 is outwardly bent in an angle of about 45 degrees with respect to the third edge 103. Both connection portions 152, 154 are defined having ends where second sealing part 150 extends in a direction parallel to edges 102 and 104.

The third and fourth connection portions 152 and 154 intersect the second and first connection portions 144 and 142, respectively.

Thus, the display area 100 is surrounded by means of the first and second sealing parts 140 and 150. An intersecting point between the first and fourth connection portions 142 and 154 is positioned at the center portion of the first edge 101, and an intersecting point between the second and third connection portions 144 and 152 is positioned at the center portion of the third edge 103.

As described above, the first sealing part 140 is formed in the first direction FD so as to apply the sealing material to the portion of the display area 100, and the second sealing part 150 is formed in the second direction SD opposite to the first direction FD so as to apply the sealing material to the remaining portion of the display area 100. The first and second sealing parts 140 and 150 intersect each other, thereby reducing a process time needed to seal the display area 100 using the sealing material. More specifically, an end seal process may be omitted and successively formed display areas are more easily generated with this process.

Embodiment 3

Figure 3A:
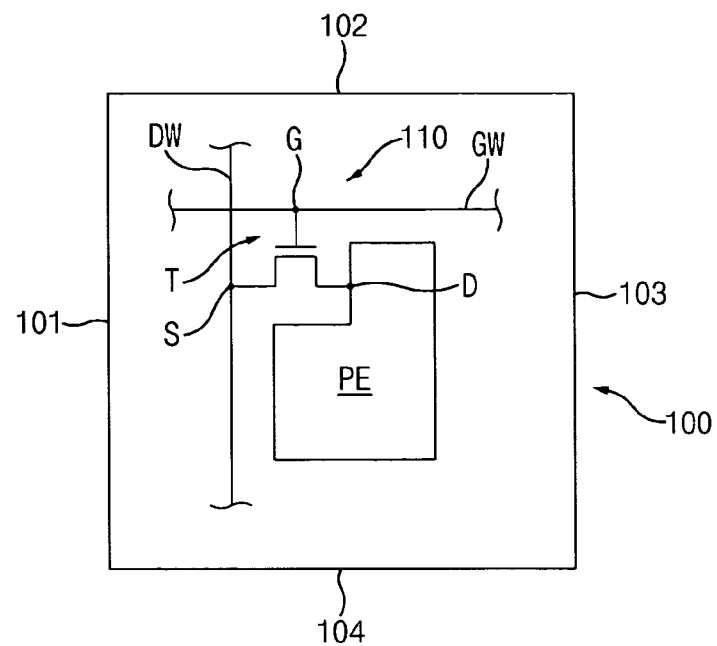
FIG. 3A is a plan view showing a display area sealed by a method of forming a sealing member according to a third exemplary embodiment of the present invention.
Figure 3B:
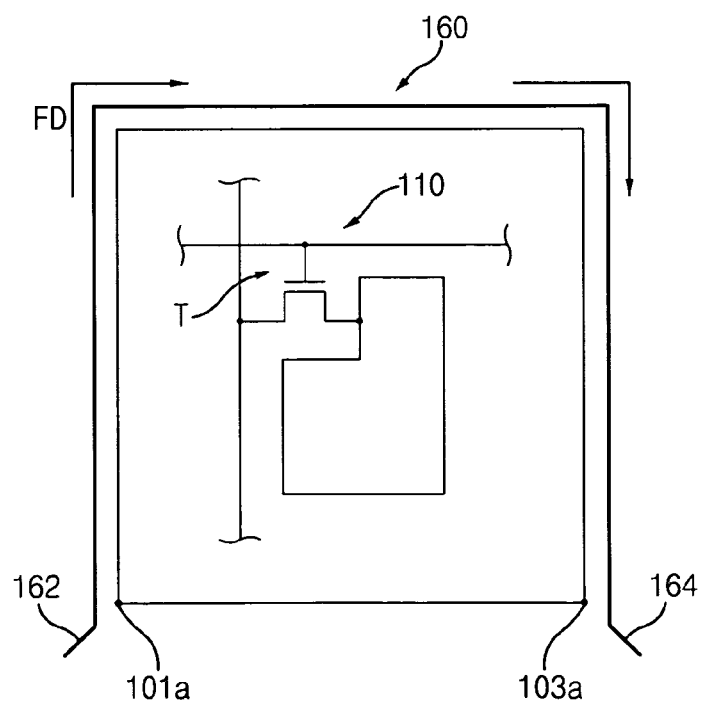
FIGS. 3B and 3C are plan views showing the display area sealed by a first sealing part and a second sealing part shown in FIG. 3A.
Figure 3C:
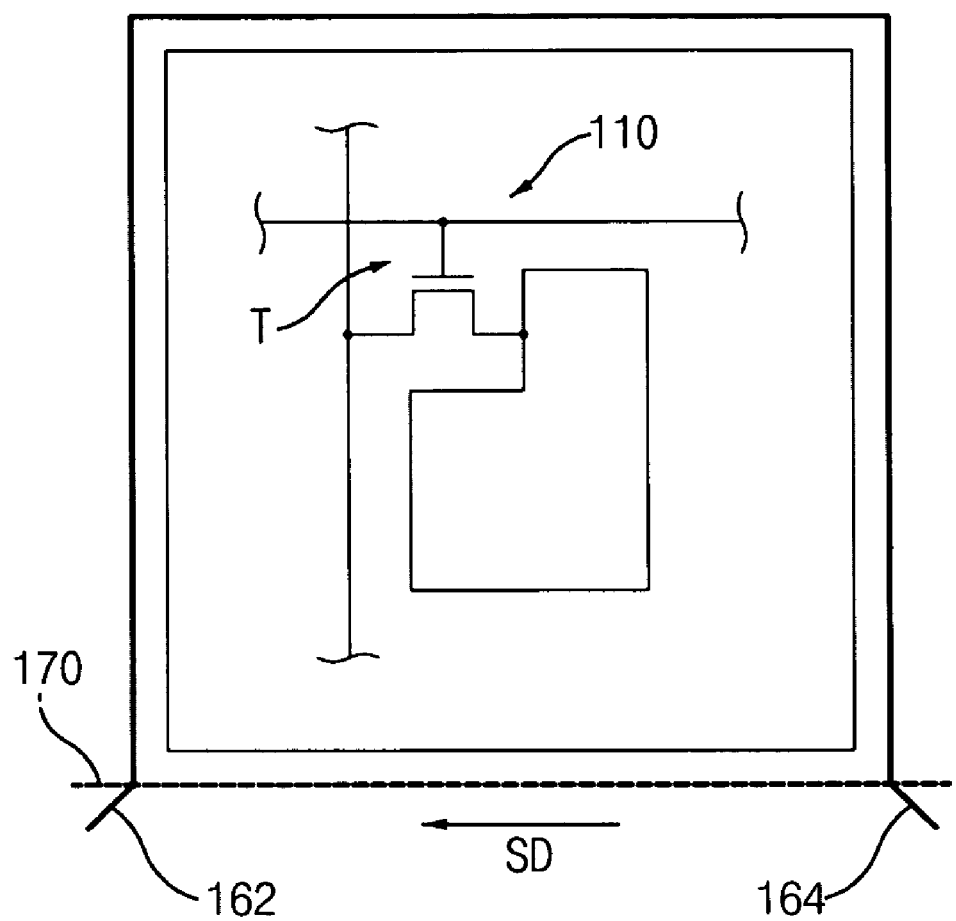

FIG. 3A is a plan view showing a display area sealed by a forming method of a sealing member according to a third exemplary embodiment of the present invention. FIGS. 3B and 3C are plan views showing the display area sealed by a first sealing part and a second sealing part shown in FIG. 3A.

Referring to FIG. 3B, a sealing material having a band shape or a string shape is formed along a first direction FD. The sealing material is formed from a corner portion 101a where a first edge 101 meets a fourth edge 104 of a display area 100 shown in FIG. 3A to a corner portion 103a where a third edge 103 meets the fourth edge 104. Thus, the first sealing part 160 includes the sealing material applied to the first edge 101, the second edge 102 and the third edge 103.

The first sealing part 160 includes a first connection portion 162 and a second connection portion 164, and the first and second connection portions 162 and 164 are formed when the first sealing part 160 is formed.

The first connection portion 162 is formed at a position proximate the corner portion 101a, and outwardly bent in an angle of about 45 degrees with respect to the first edge 101. The second connection portion 164 is formed at a position proximate the corner portion 103a, and outwardly bent in an angle of about 45 degrees with respect to the third edge 103.

Referring to FIG. 3C, a sealing material is formed along a second direction SD opposite the first direction FD. The sealing material is formed from the corner portion 103a of the third edge 103 of the display area 100 shown in FIG. 3A to the corner portion 101a of the first edge 101. Thus, the second sealing part 170 includes the sealing material applied along the fourth edge 104.

The first sealing part 160 and the second sealing part 170 intersect each other at the corner portion 101a where the first edge 101 meets the fourth edge 104 and at the corner portion 103a where the third edge 103 meets the fourth edge 104, respectively. The first and second sealing parts 160 and 170 surround the display area 100.

As described above, the first sealing part 160 is formed in the first direction FD so as to apply the sealing material to the portion of the display area 100, and the second sealing part 170 is formed in the second direction SD opposite to the first direction FD so as to apply the sealing material to the remaining portion of the display area 100. The first and second sealing parts 160 and 170 are intersected with each other, thereby reducing a process time needed to seal the display area 100 using the sealing material.

Embodiment 4

FIG. 4A is a plan view showing a plurality of display areas sealed by a method of forming a sealing member according to a fourth exemplary embodiment of the present invention.

Referring to FIG. 4A, a plurality of display areas 200 each having a pixel 110 is juxtaposed with one another, and the pixel 110 is formed by a thin film manufacturing process. In this exemplary embodiment, three display areas 200 juxtaposed with one another will be described. The three display areas 200 are represented by a first display area 210, a second display area 220 and a third display area 230 in turn.

The first, second and third display areas 210, 220 and 230 are juxtaposed with one another so as to allow a data line DW disposed in each of the first, second and third displays 210, 220 and 230 to be juxtaposed with one another. Also, the first, second and third display areas 210, 220 and 230 are spaced apart from each other by an interval (G).

In this exemplary embodiment, the first display area 210 includes a first edge 211, a second edge 212, a third edge 213 and a fourth edge 214, the second display area 220 includes a first edge 221, a second edge 222, a third edge 223 and a fourth edge 224, and the third display area 230 includes a first edge 231, a second edge 232, a third edge 233 and a fourth edge 234.

The first edges 211, 221 and 231 of the first, second and third display areas 210, 220 and 230 are substantially parallel to each other. The second edges 212, 222 and 232 of the first, second and third display areas 210, 220 and 230 are adjacent to the first edges 211, 221 and 231, respectively. The third edges 213, 223 and 233 of the first, second and third display areas 210, 220 and 230 are substantially parallel to the first edges 211, 221 and 231, respectively. The fourth edges 214, 224 and 234 of the first, second and third display areas 210, 220 and 230 are substantially parallel to the second edges 212, 222 and 232.

Thus, the first edges 211, 221 and 231, the second edges 212, 222 and 232, the third edges 213, 223 and 233 and the fourth edges 214, 224 and 234 of the first, second and third display areas 210, 220 and 230 are sequentially connected to each other.

Figure 4B:
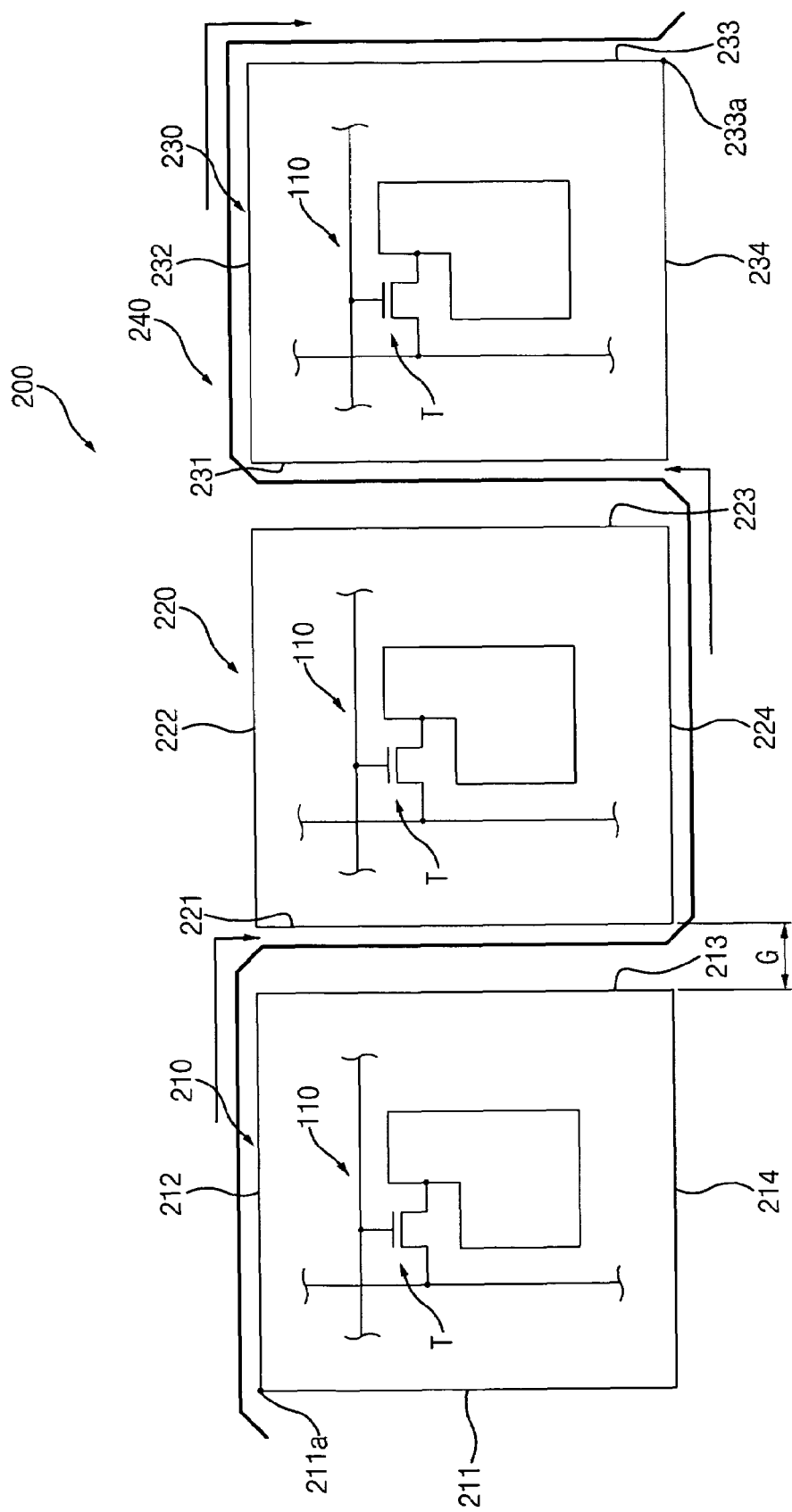
FIG. 4B is a plan view showing a portion of the display area sealed by a first sealing part shown in FIG. 4A.

FIG. 4B is a plan view of FIG. 4A showing a portion of the display area sealed by a first sealing part. A first sealing part 240 is applied to a portion of the first, second and third display areas 210, 220 and 230 so as to seal the first edges 221 and 231, the second edges 212 and 232, the third edges 213, 223 and 233 and the fourth edge 224.

In order to form the first sealing part 240, a sealing material having a band shape or a string shape is formed at a corner portion 211a where the first edge 211 meets the second edge 212 of the first display area 210.

The sealing material is formed along the second edge 212 of the first display area 210 and the first edge 221 of the second display area 220 while passing through the interval (G) between the first and second display areas 210 and 220.

Then, the sealing material is successively formed along the fourth edge 224 of the second display area 220 and the first edge 231 of the third display area 230 while passing through the interval between the second and third display areas 220 and 230.

The sealing material is successively formed along the second and third edges 232 and 233 of the third display area 230 until a corner portion 233a where the third edge 233 meets the fourth edge 234 of the third display area 230. Thus, the first sealing part 240 that partially seals the first, second and third display areas 210, 220 and 230 is formed.

That is, the first sealing part 240 seals the second edge 212 of the first display area 210, the first and fourth edges 221 and 224 of the second display area 220, and first, second and third edges 231, 232 and 233 of the third display area 230.

FIG. 4C is a plan view of FIG. 4B showing a remaining portion of the display area 200 sealed by a second sealing part. A second sealing part 250 is applied to a portion of the first, second and third display areas 210, 220 and 230 so as to seal the first edges 211, 221 and 231, the second edge 222, the third edges 213 and 223 and the fourth edges 214 and 234.

In order to form the second sealing part 250, the sealing material having the band shape or the string shape is formed at a corner portion 233a where the third edge 233 meets the fourth edge 234 of the third display area 230. The second sealing part 250 crosses the first sealing part 240 at the corner portion 233a.

The sealing material is formed along the fourth edge 234 of the third display area 230. The sealing material is formed along the third edge 223 and the second edge 222 of the second display area 220 while passing through the interval between the second and third display areas 220 and 230.

Then, the sealing material is successively formed along the third, fourth and first edges 213, 214 and 211 of the first display area 210 while passing through the interval between the first and second display areas 210 and 220. The sealing material also crosses the first sealing part 240 at the corner portion 211a where the first edge 211 meets the second edge 212 of the first display area 210.

That is, the second sealing part 250 seals the first, third and fourth edges 211, 213 and 214 of the first display area 210, the second and third edges 222 and 223 of the second display area 220, and the fourth edge 234 of the third display area 230.

Thus, the first to fourth edges 211, 212, 213 and 214 of the first display area 210, the first to fourth edges 221, 222, 223 and 224 of the second display area 220 and the first to fourth edges 231, 232, 233 and 234 of the third display area 230 are completely sealed by the first and second sealing parts 240 and 250.

According to this exemplary embodiment, a process time needed to seal the display area 200 using the sealing material may be reduced.

In this exemplary embodiment, the first and second sealing parts 240 and 250 are separately formed, however, the first and second sealing parts 240 and 250 may be successively formed.

Embodiment 5

FIG. 5A is a plan view showing a plurality of display areas sealed by a method of forming a sealing member according to a fifth exemplary embodiment of the present invention. A plurality of display areas 200 having each a pixel 110 is juxtaposed with one another, and the pixel 110 is formed by a thin film manufacturing process. In this exemplary embodiment, three display areas 200 juxtaposed with one another will be described. The three display areas 200 are represented by a first display area 210, a second display area 220 and a third display area 230 in turn.

The first, second and third display areas 210, 220 and 230 are juxtaposed with one another so as to allow a data line DW disposed in each of the first, second and third displays 210, 220 and 230 to be juxtaposed with one another. Also, the first, second and third display areas 210, 220 and 230 are spaced apart from each other by an interval (G).

In this exemplary embodiment, the first display area 210 includes a first edge 211, a second edge 212, a third edge 213 and a fourth edge 214, the second display area 220 includes a first edge 221, a second edge 222, a third edge 223 and a fourth edge 224, and the third display area 230 includes a first edge 231, a second edge 232, a third edge 233 and a fourth edge 234.

The first edges 211, 221 and 231 of the first, second and third display areas 210, 220 and 230 are substantially parallel to each other. The second edges 212, 222 and 232 of the first, second and third display areas 210, 220 and 230 are adjacent to the first edges 211, 221 and 231, respectively. The third edges 213, 223 and 233 of the first, second and third display areas 210, 220 and 230 are substantially parallel to the first edges 211, 221 and 231, respectively. The fourth edges 214, 224 and 234 of the first, second and third display areas 210, 220 and 230 are substantially parallel to the second edges 212, 222 and 232.

Thus, the first edges 211, 221 and 231, the second edges 212, 222 and 232, the third edges 213, 223 and 233 and the fourth edges 214, 224 and 234 of the first, second and third display areas 210, 220 and 230 are sequentially connected to each other.

Figure 5B:
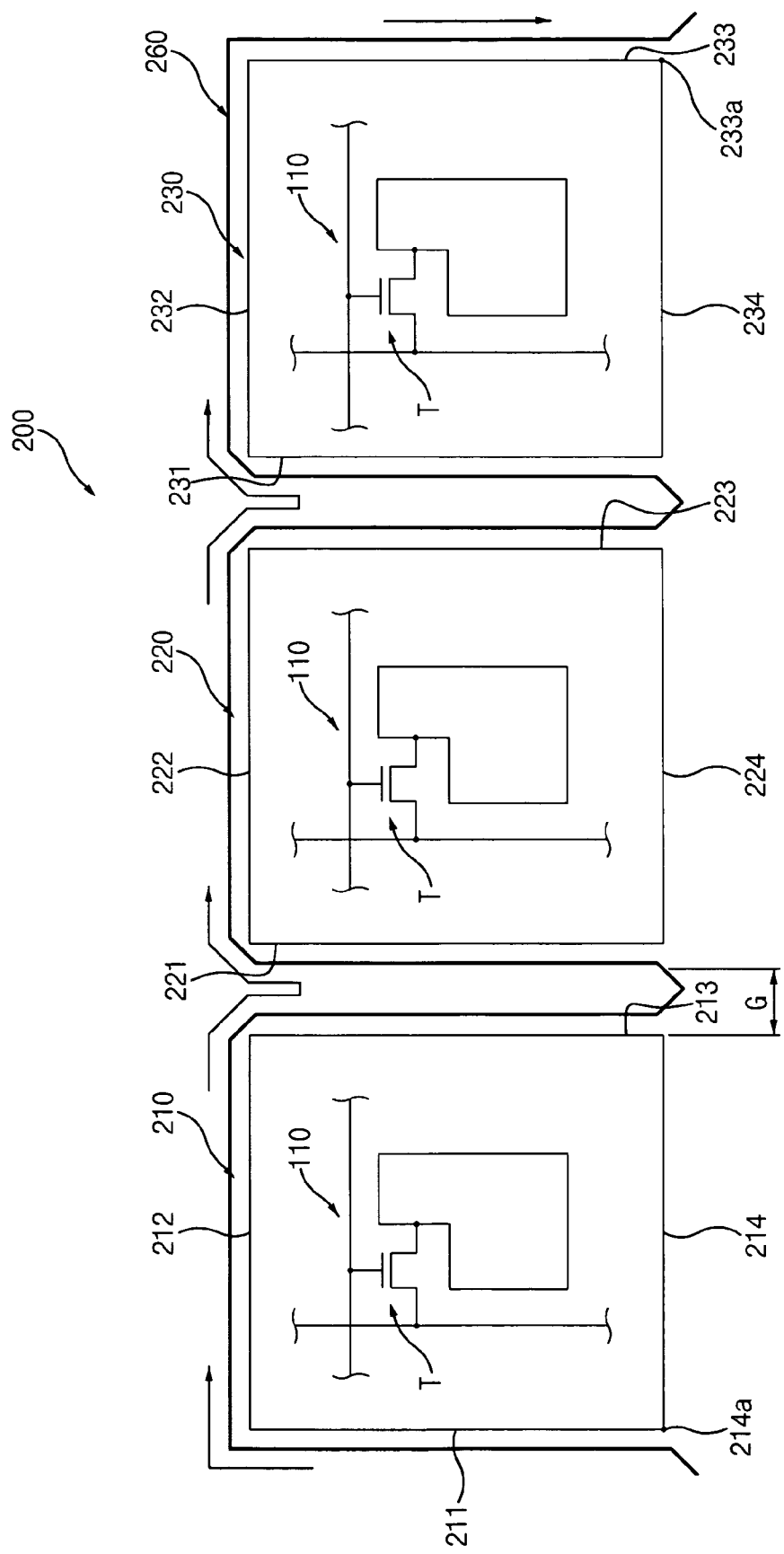
FIG. 5B is a plan view showing a portion of the display area sealed by a first sealing part shown in FIG. 5A.

FIG. 5B is a plan view of FIG. 5A showing a portion of the display area sealed by a first sealing part. A first sealing part 260 is applied to a portion of the first, second and third display areas 210, 220 and 230 so as to seal the first edges 211, 221 and 231, the second edges 212, 222 and 232, the third edges 213, 223 and 233 and the fourth edges 214, 224 and 234.

In order to form the first sealing part 260, a sealing material having a band shape or a string shape is formed at a corner portion 214a where the first edge 211 meets the fourth edge 214 of the first display area 210.

The sealing material is formed along the first, second and third edges 211, 212 and 213 of the first display area 210.

The sealing material changes a direction thereof at the third edge 213 of the first display area 210 to be formed along the first, second and third edges 221, 222 and 223 of the second display area 220.

Also, the sealing material changes a direction thereof at the third edge 223 of the second display area 220 to be formed along the first, second and third edges 221, 222 and 223 of the third display area 230 until a corner portion 233a where the third edge 233 meets the fourth edge 234 of the third display area 230.

Thus, the first sealing part 260 partially seals the first, second and third display areas 210, 220 and 230 and has a pulse shape in two-dimensions.

FIG. 5C is a plan view FIG. 5B showing a remaining portion of the display area sealed by a second sealing part. A second sealing part 270 seals the fourth edges 214, 224 and 234 of the first, second and third display areas 210, 220 and 230.

In order to form the second sealing part 270, the sealing material having the band shape or the string shape is formed at the corner portion 233a where the third edge 233 meets the fourth edge 234 of the third display area 230, and intersects the first sealing part 260. The second sealing part 270 is successively formed along the fourth edge 234 of the third display area 230, the fourth edge 224 of the second display area 220 and the fourth edge 214 of the first display area 210. The second sealing part 270 also intersects the first sealing part 260 proximate the corner portion 214a where the first edge 211 meets the fourth edge 214 of the first display area 210.

Thus, the first to fourth edges 211, 212, 213 and 214 of the first display area 210, the first to fourth edges 221, 222, 223 and 224 of the second display area 220 and the first to fourth edges 231, 232, 233 and 234 of the third display area 230 are completely sealed by the first and second sealing parts 260 and 270. In this exemplary embodiment, the first and second sealing parts 260 and 270 may be successively formed.

Apparatus for Forming a Sealing Member

Embodiment 6

Figure 6:
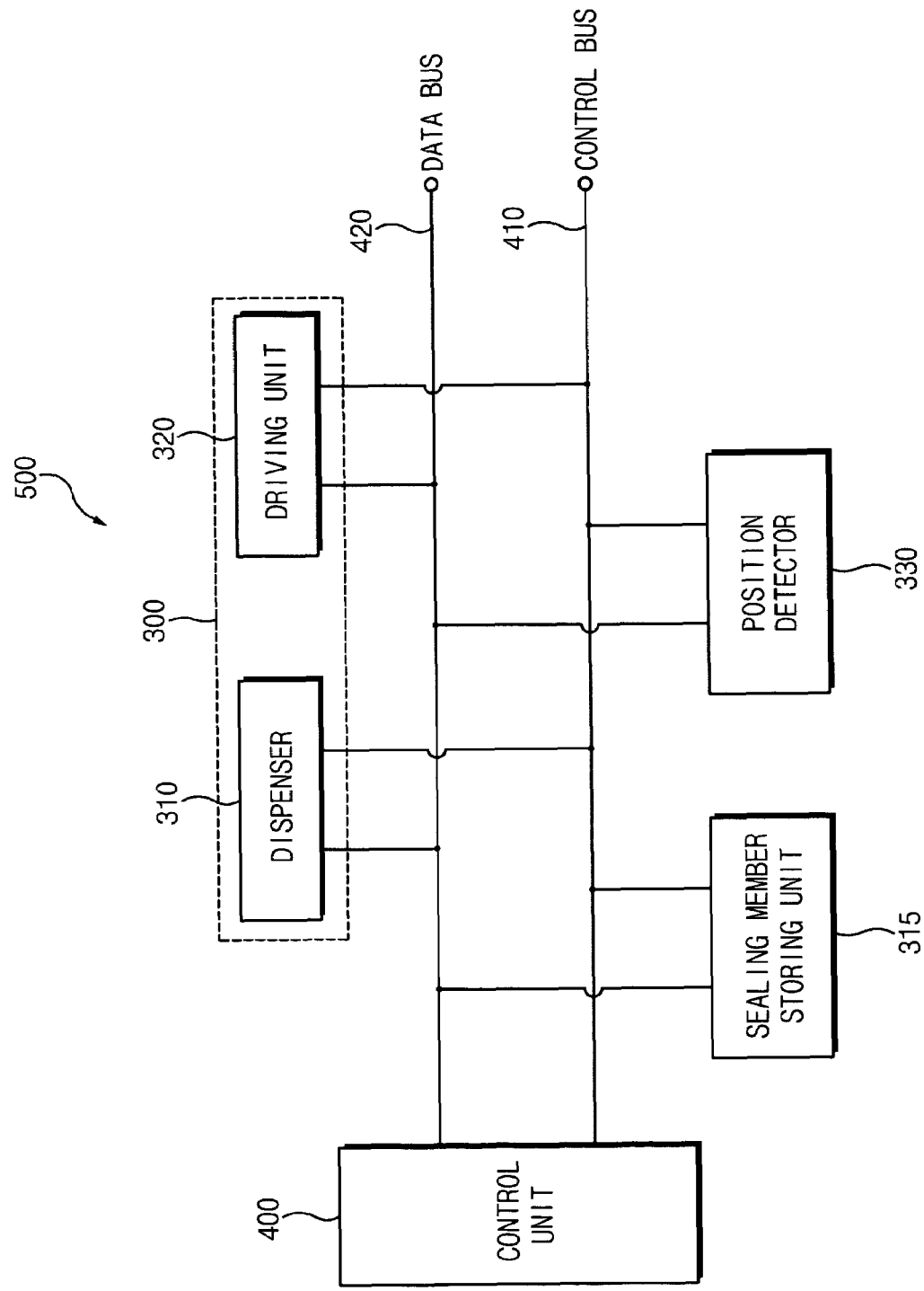
FIG. 6 is a block diagram showing an apparatus for forming a sealing member according to a sixth exemplary embodiment of the present invention.
Figure 7:
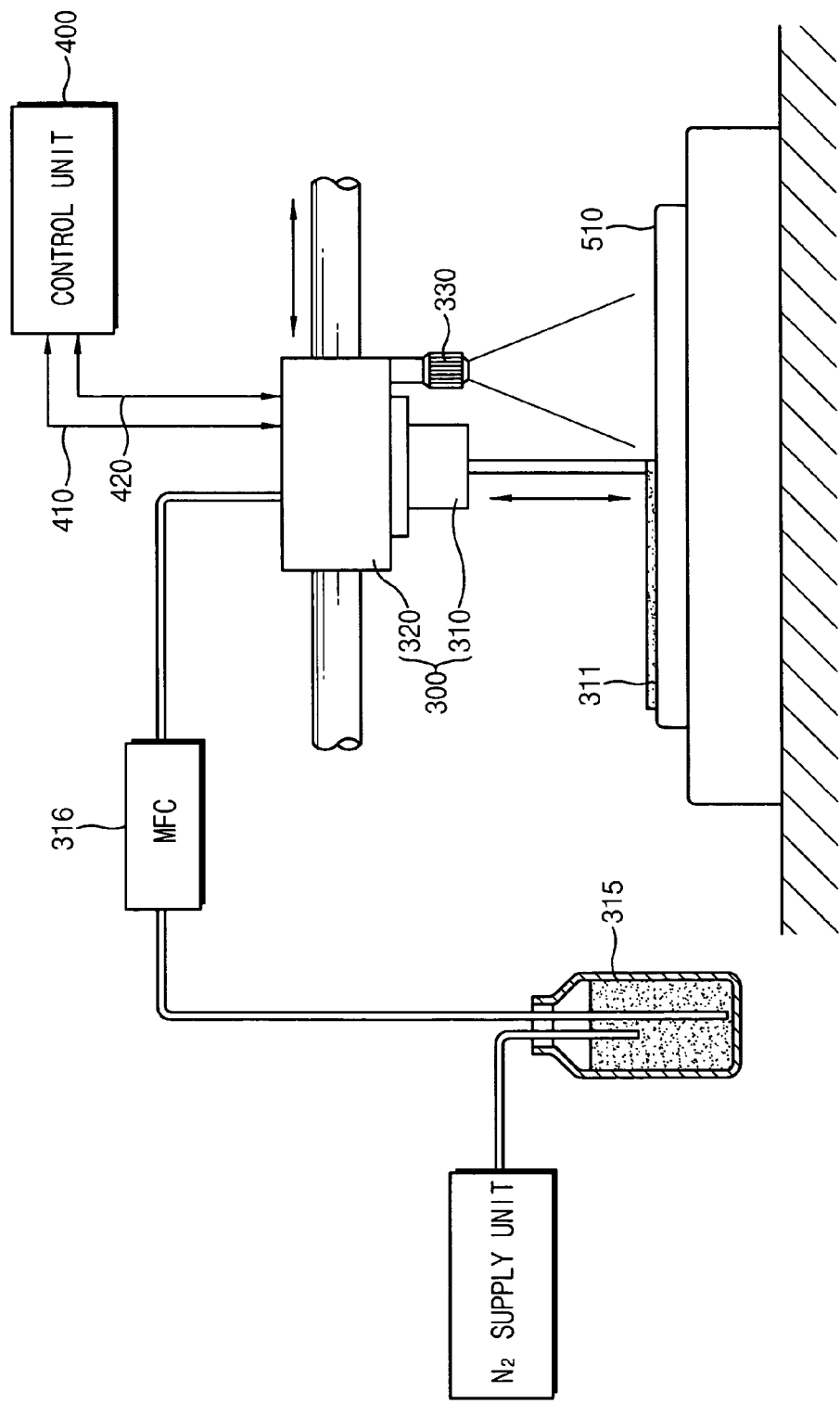
FIG. 7 is a schematic view showing the apparatus for forming a sealing member shown in FIG. 6.

FIG. 6 is a block diagram showing a sealing member forming apparatus according to a sixth exemplary embodiment of the present invention. FIG. 7 is a schematic view showing the forming apparatus of a sealing member shown in FIG. 6.

Referring to FIGS. 6 and 7, a sealing member forming apparatus 500 includes a sealing member coating unit 300 and a control unit 400.

The sealing member coating unit 300 includes a dispenser 310 and a driving unit 320.

The dispenser 310 discharges a sealing member 311 having a band shape or a string shape to a substrate 510 into which a display area is formed. The driving unit 320 precisely drives the dispenser 310 disposed over the substrate 510.

The dispenser 310 receives a flowable sealing material from the sealing member storing unit 315. The sealing member storing unit 315 stores the sealing material and includes a mass flow controller (MFC) 315 so as to supply the stored sealing material to the dispenser 310 by a predetermined mass.

In this exemplary embodiment, the driving unit 320 is an XY table for driving the dispenser 310. In order to adjust an interval between the substrate 510 and the dispenser 310, the driving unit 320 may further include a vertical transfer unit (not shown) that transfers the dispenser 310 in a substantially vertical direction with respect to an upper surface of the substrate 510.

Also, the sealing member coating unit 300 may further include a position detector 330 so as to precisely control the driving unit 320.

The position detector 330 detects an edge position of the display area formed on the substrate 510 and converts the edge position of the display area into a digital signal. In this exemplary embodiment, a charge-coupled device (CCD) camera is used as the position detector 330. Alternatively, the sealing member coating unit 300 may control the driving unit 320 based on measured data that is measured by a separate measuring instrument.

The dispenser 310, the driving unit 320, the sealing member storing unit 315 and the position detector 330 are connected to each other by means of the control unit 400 and a control bus 410. The control bus 410 receives a control signal from the control unit 400 and applies the received control signal to the dispenser 310, the driving unit 320, the sealing member storing unit 315 and the position detector 330.

Also, the dispenser 310, the driving unit 320, the sealing member storing unit 315 and the position detector 330 are connected to each other by means of the control unit 400 and a data bus 420. The data bus 420 receives data from the control unit 400 and applies the received data to the dispenser 310, the driving unit 320, the sealing member storing unit 315 and the position detector 330.

The control unit 400 generates a control signal so as to precisely control the driving unit 320. Responsive to the control signal from the control unit 400, the driving unit 320 controls a position of the dispenser 310, and the dispenser 310 provides the sealing material having the band shape or the string shape onto a predetermined position of the substrate 510.

In this exemplary embodiment, the driving unit 320 transfers the dispenser 310 to a first direction along the edges of the display area formed on the substrate 510 in response to the control signal from the control unit 400, thereby partially applying a first sealing part proximate the edges of the display area.

The driving unit 320 also transfers the dispenser 310 in a second direction different from the first direction in response to the control signal from the control unit 400, thereby partially applying a second sealing part to the remaining edges of the display area. In one embodiment, the second direction is opposite of the first direction, but is not limited thereto.

The edges of the display area are surrounded by the first and second sealing parts. In this exemplary embodiment, the control unit 400 may form the first and second sealing parts applied to the substrate 510 through various paths according to a number of the display areas.

Hereinafter, the control unit 400 that generates the control signal so as to form the first and second sealing parts when the display area is a unit will be described.

Figure 8A:
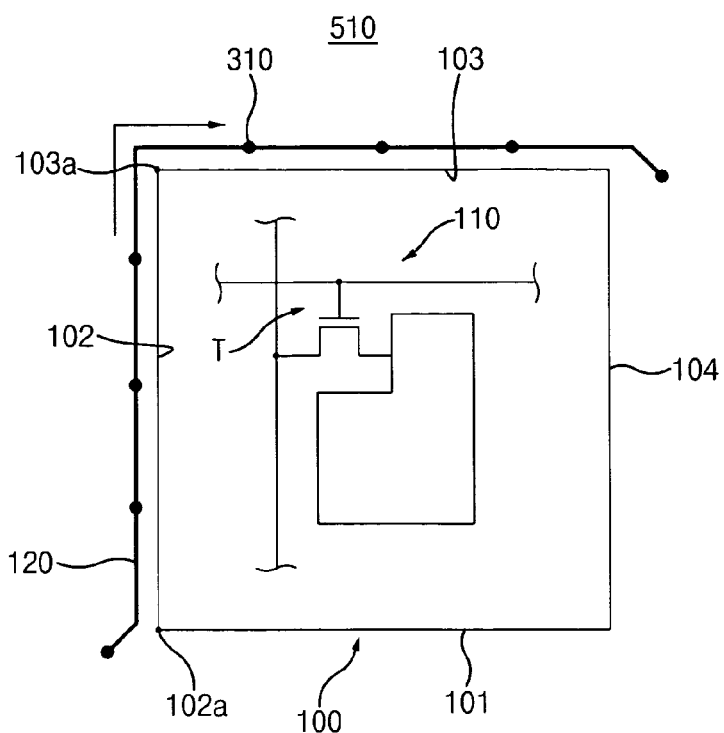
FIGS. 8A and 8B are plan views showing a first sealing part and a second sealing part applied to one display area by a sealing member forming apparatus according to the sixth exemplary embodiment of the present invention.
Figure 8B:
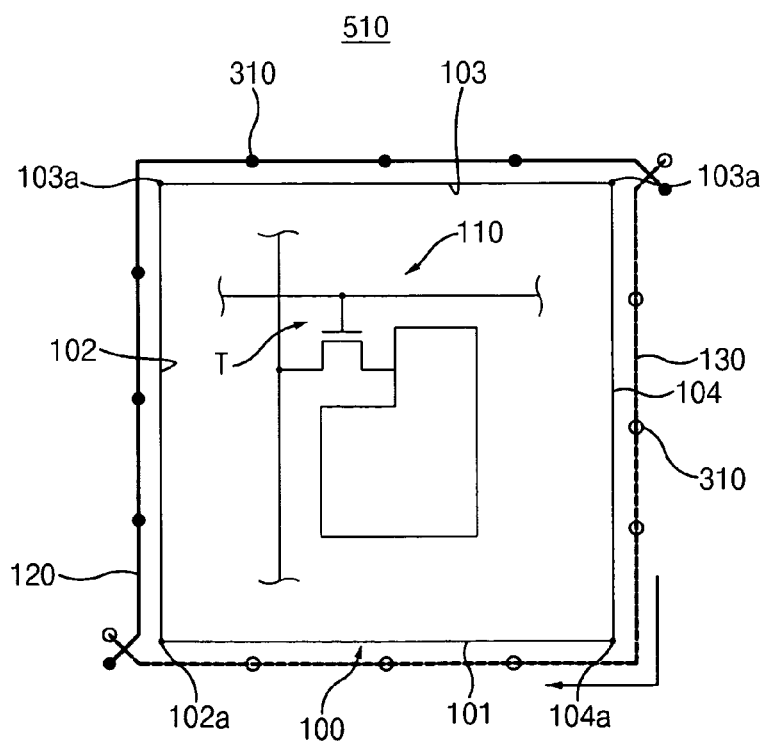

FIGS. 8A and 8B are plan views showing a first sealing part and a second sealing part applied to one display area by an apparatus for forming a sealing member according to the sixth exemplary embodiment of the present invention.

Referring to FIGS. 6, 7 and 8A, a display area 100 includes a first edge 101, a second edge 102, a third edge 103 and a fourth edge 104. The first, second, third and fourth edges 101, 102, 103 and 104 are successively connected to each other. The first and second edges 101 and 102 face the third and fourth edges 103 and 104, respectively.

The control unit 400 generates a first control signal in response to position data with respect to the first, second, third and fourth edges 101, 102, 103 and 104 of the display area 100 detected by means of the position detector 330.

In this exemplary embodiment, the driving unit 320 adjusts a moving path of the dispenser 310 in response to the first control signal. The dispenser 310 applies the sealing material having the band shape or the string shape from a corner portion 102a where the first edge 101 meets the second edge 102. The dispenser 310 successively applies the sealing material along the first edge 101 and the second edge 102. Thus, the sealing material is formed along the first and second edges 101 and 102, thereby forming a first sealing part 120.

In FIG. 8A, black dots corresponding with first sealing part 120 show the moving path of the dispenser 310 while the first sealing part 120 is formed.

Referring to FIG. 8B, the control unit 400 generates a second control signal in response to the position data with respect to the first, second, third and fourth edges 101, 102, 103 and 104 of the display area 100 detected by means of the position detector 330.

In this exemplary embodiment, the driving unit 320 adjusts a moving path of the dispenser 310 in response to the second control signal. The dispenser 310 applies the sealing material from a corner portion 103a where the third edge 103 meets the fourth edge 104. The dispenser 310 successively applies the sealing material along the fourth edge 104 and the first edge 101. Thus, the sealing material is formed along the fourth and first edges 104 and 101, thereby forming a second sealing part 130. The second sealing part 130 intersects with the first sealing part 120 at the corner portions 102a and 103a.

In FIG. 8B, white dots corresponding with second sealing part 130 show the moving path of the dispenser 310 while the second sealing part 130 is formed.

Embodiment 7

Figure 9A:
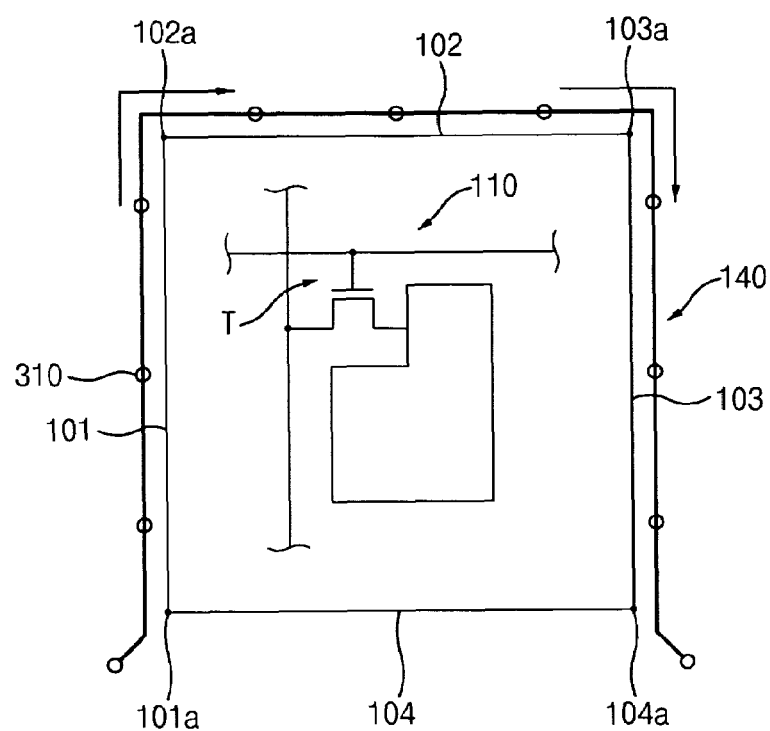
FIGS. 9A and 9B are plan views showing a first sealing part and a second sealing part applied to one display area by a sealing member forming apparatus according to the seventh exemplary embodiment of the present invention.
Figure 9B:
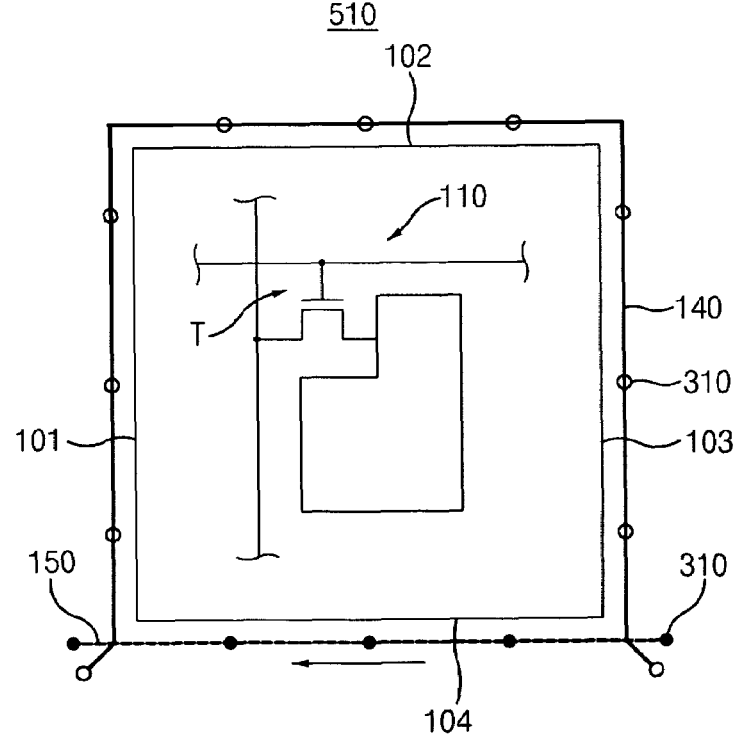

FIGS. 9A and 9B are plan views showing a first sealing part and a second sealing part applied to one display area by a sealing member forming apparatus according to the seventh exemplary embodiment of the present invention. In this exemplary embodiment, the sealing member forming apparatus has same elements as those in FIG. 6, and thus the detailed descriptions of the same elements will be omitted.

Referring to FIGS. 6, 7 and 9A, a display area 100 includes a first edge 101, a second edge 102, a third edge 103 and a fourth edge 104. The first, second, third and fourth edges 101, 102, 103 and 104 are successively connected to each other. The first and second edges 101 and 102 face the third and fourth edges 103 and 104, respectively.

The control unit 400 generates a first control signal in response to position data with respect to the first, second, third and fourth edges 101, 102, 103 and 104 of the display area 100 detected by means of the position detector 330.

In this exemplary embodiment, the driving unit 320 adjusts a moving path of the dispenser 310 in response to the first control signal. The dispenser 310 applies the sealing material having the band shape or the string shape from a corner portion 101a where the first edge 101 meets the fourth edge 104. The dispenser 310 successively applies the sealing material along the first, second and third edges 101, 102 and 103. Thus, the sealing material is formed along the first, second and third edges 101, 102 and 103, thereby forming a first sealing part 140.

In FIG. 9A, white dots corresponding with first sealing part 140 show the moving path of the dispenser 310 while the first sealing part 140 is formed.

Referring to FIG. 9B, the control unit 400 generates a second control signal in response to the position data with respect to the first, second, third and fourth edges 101, 102, 103 and 104 of the display area 100 detected by means of the position detector 330.

In this exemplary embodiment, the driving unit 320 adjusts a moving path of the dispenser 310 in response to the second control signal. The dispenser 310 applies the sealing material from a corner portion 104a (FIG. 9A) where the third edge 103 meets the fourth edge 104. The dispenser 310 applies the sealing material along the fourth edge 104. Thus, the sealing material is formed along the fourth edge 104, thereby forming a second sealing part 150. The second sealing part 150 intersects the first sealing part 140 at the corner portions 104a and 101a.

In FIG. 9B, black dots corresponding with second sealing part 150 show the moving path of the dispenser 310 while the second sealing part 150 is formed.

Embodiment 8

Figure 10A:
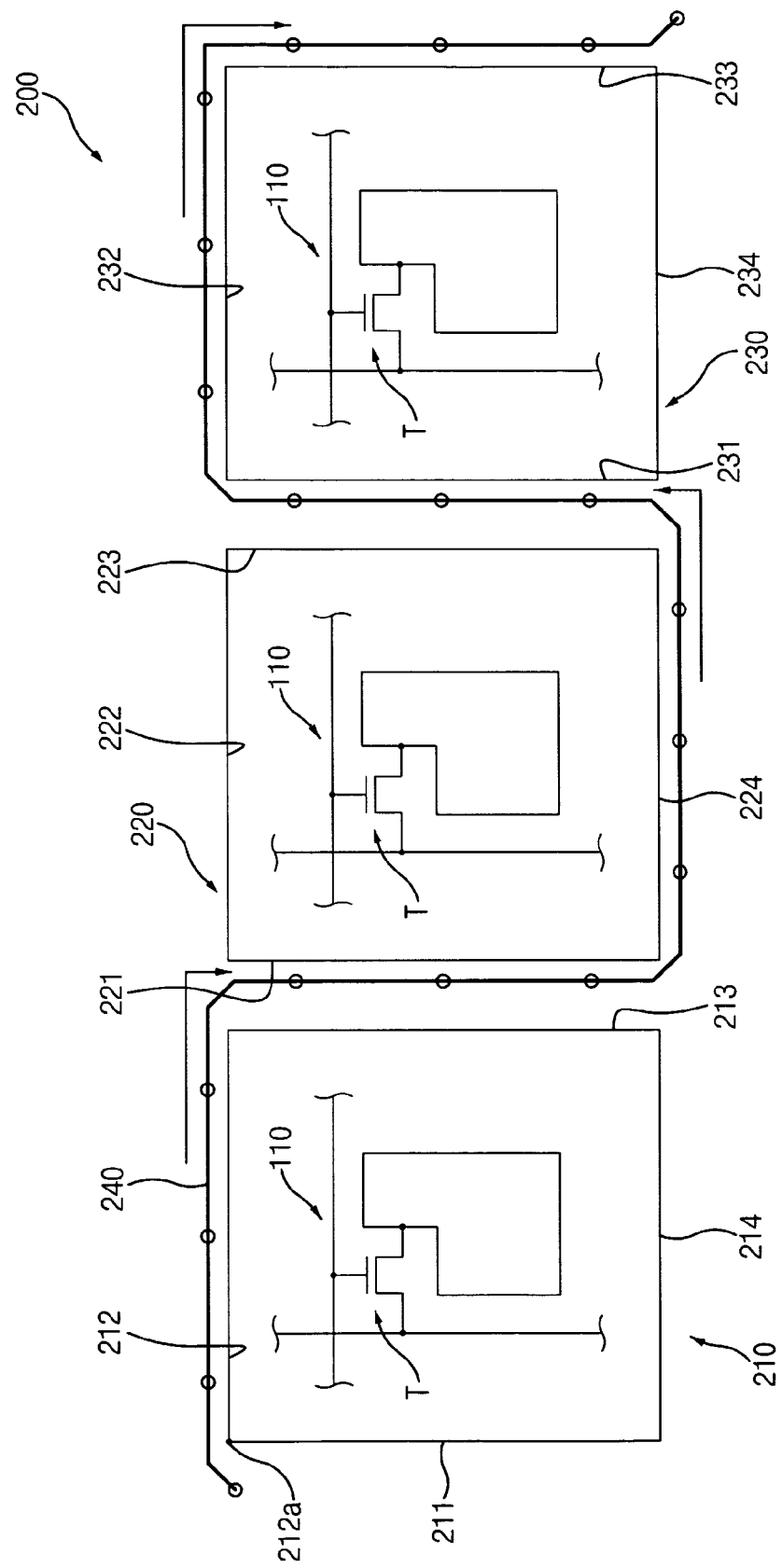
FIGS. 10A and 10B are plan views showing a first sealing part and a second sealing part applied to a plurality of display areas by a sealing member forming apparatus according to the eighth exemplary embodiment of the present invention.
Figure 10B:
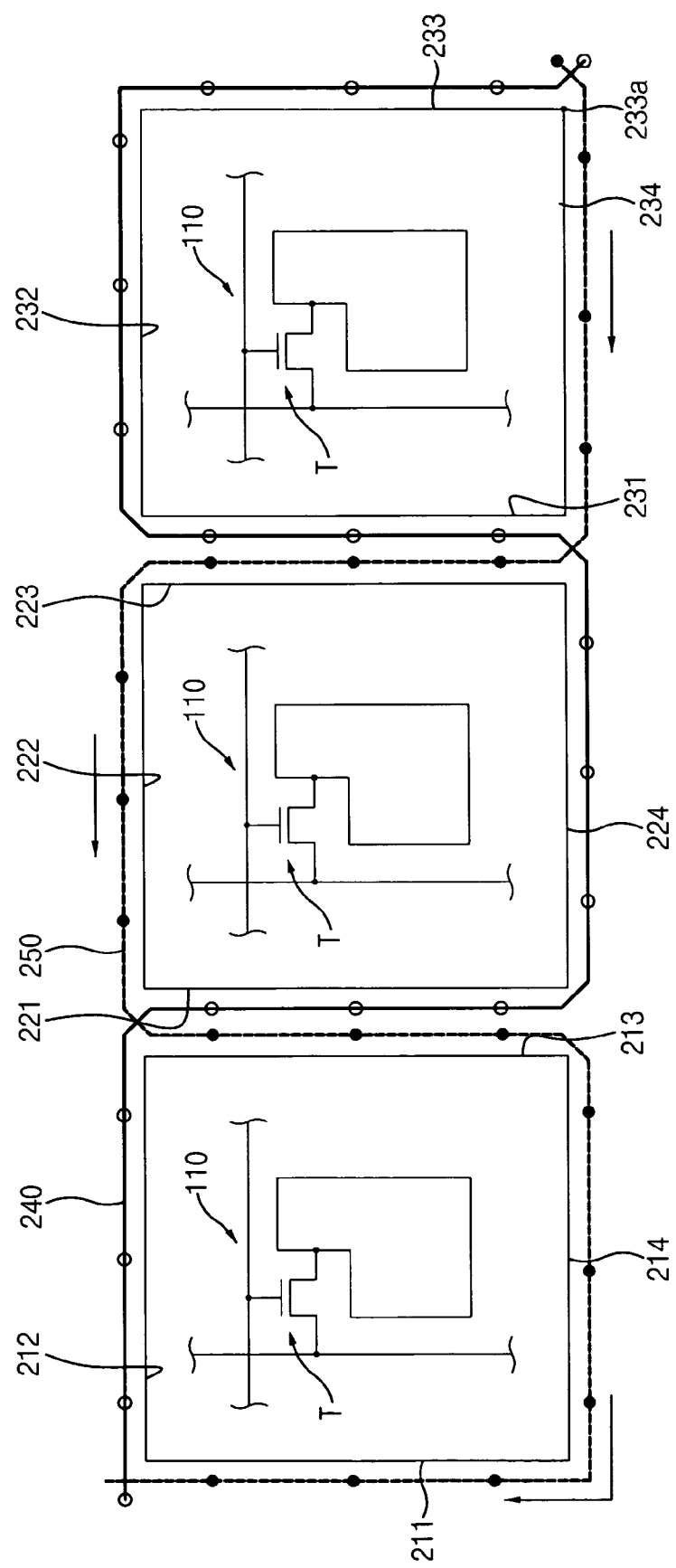

FIGS. 10A and 10B are plan views showing a first sealing part and a second sealing part applied to a plurality of display areas by a sealing member forming apparatus according to an eighth exemplary embodiment of the present invention. In this exemplary embodiment, the sealing member forming apparatus has the same elements as those in FIG. 6, and thus the detailed descriptions of the same elements will be omitted.

Referring to 6, 7 and 10A, a plurality of display areas 200 having a pixel 110 is juxtaposed with one another. In this exemplary embodiment, three display areas 200 juxtaposed with one another will be described. The three display areas 200 are represented by a first display area 210, a second display area 220 and a third display area 230 in turn.

In this exemplary embodiment, the first display area 210 includes a first edge 211, a second edge 212, a third edge 213 and a fourth edge 214, the second display area 220 includes a first edge 221, a second edge 222, a third edge 223 and a fourth edge 224, and the third display area 230 includes a first edge 231, a second edge 232, a third edge 233 and a fourth edge 234.

The first edges 211, 221 and 231 of the first, second and third display areas 210, 220 and 230 are substantially parallel to each other. The second edges 212, 222 and 232 of the first, second and third display areas 210, 220 and 230 are adjacent to the first edges 211, 221 and 231, respectively. The third edges 213, 223 and 233 of the first, second and third display areas 210, 220 and 230 are substantially parallel to the first edges 211, 221 and 231, respectively. The fourth edges 214, 224 and 234 of the first, second and third display areas 210, 220 and 230 are substantially parallel to the second edges 212, 222 and 232.

In order to seal the first, second and third display areas 210, 220 and 230 using a sealing material having a band shape or a string shape, the control unit 400 generates a first control signal in response to position data with respect to the first, second, third and fourth edges of each of the first, second and third display areas 210, 220 and 230 detected by means of the position detector 330.

In this exemplary embodiment, the driving unit 310 adjusts a moving path of the dispenser 310 in response to the first control signal. The dispenser 310 applies the sealing material to a corner portion 212a where the first edge 211 meets the second edge 212. The dispenser 310 applies the sealing material along the second edge 212.

The dispenser 310 forms the sealing material along the first edge 221 while passing through a space between the first and second display areas 210 and 220.

The dispenser 310 forms the sealing material along the fourth edge 224 of the second display area 220, and successively forms the sealing material along the first, second and third edges 231, 232 and 233 of the third display area 230 after passing through a space between the second and third display areas 220 and 230.

More specifically, the dispenser 310 forms the sealing material along the second edge 212 of the first display area 210, the first and fourth edges 221 and 224 of the second display area 220, and the first, second and third edges 231, 232 and 233 of the third display area 230, thereby forming a first sealing part 240.

In FIG. 10A, white dots corresponding with sealing part 240 show the moving path of the dispenser 310 while the first sealing part 240 is formed.

Referring to FIG. 10B, the control unit 400 generates a second control signal in response to the position data with respect to the first, second, third and fourth edges of the first, second and third display areas 210, 220 and 230 detected by means of the position detector 330. The driving unit 320 adjusts a moving path of the dispenser 310 in response to the second control signal.

The dispenser 310 applies the sealing material to a corner portion 233a where the third edge 233 meets the fourth edge 234 of the third display area 230. The dispenser 310 forms the sealing material along the fourth edge 234.

The dispenser 310 forms the sealing material along the third edge 223 and the second edge 222 of the second display area 220 after passing through the space between the second and third display areas 220 and 230.

The dispenser 310 forms the sealing material along the third, fourth and first edges 213, 214 and 211 of the first display area 210 after passing through the space between the first and second display area 210 and 220.

More specifically, the dispenser 310 forms the sealing material along the fourth edge 234 of the fourth display area 230, the third and second edges 223 and 222 of the second display area 220, and the third, fourth and first edges 213, 214 and 211 of the first display area 210, thereby forming a second sealing part 250.

The second sealing part 250 intersects the first sealing part 240 at the corner portion 233a.

In FIG. 10B, black dots corresponding with the second sealing part 250 show the moving path of the dispenser 310 while the second sealing part 250 is formed.

Embodiment 9

Figure 11B:
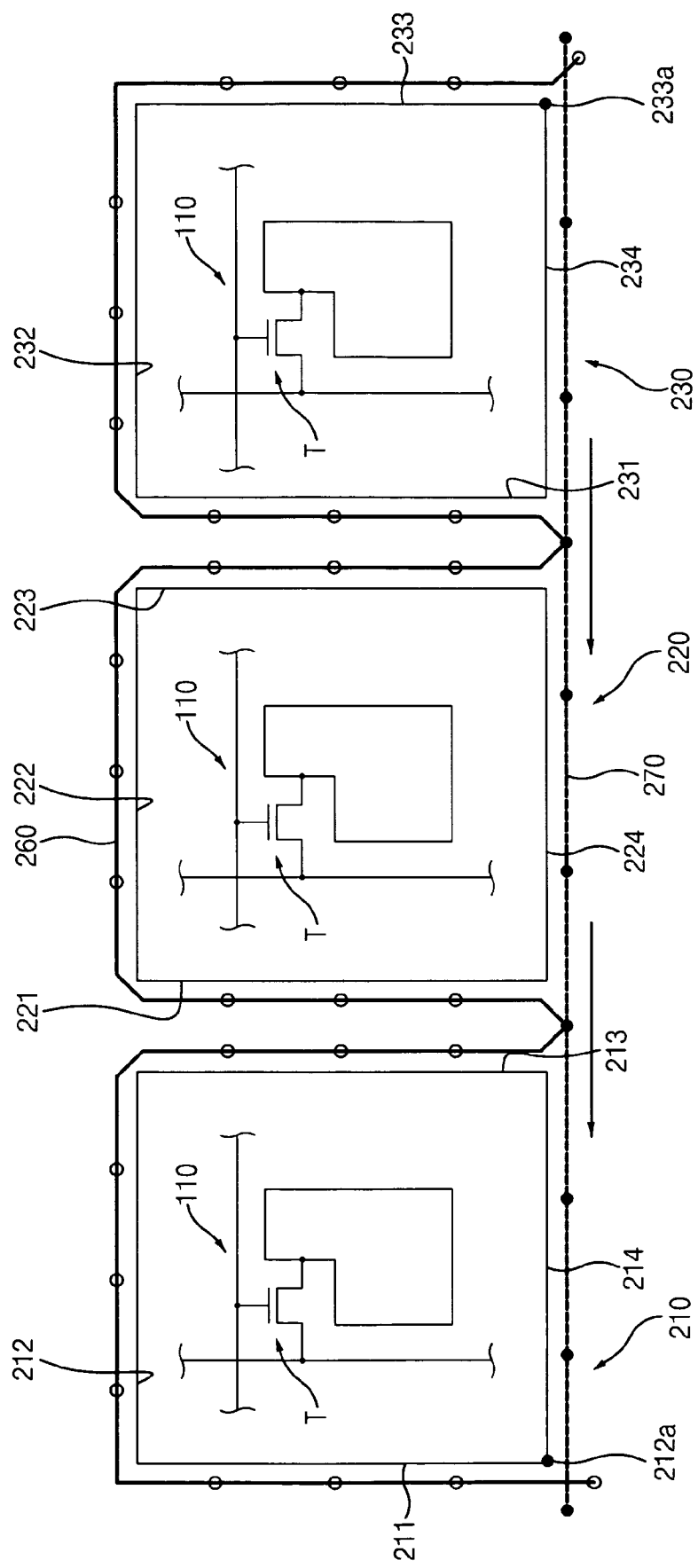

FIGS. 11A and 11B are plan views showing a first sealing part and a second sealing part applied to a plurality of display areas by a sealing member forming apparatus according to a ninth exemplary embodiment of the present invention. In this exemplary embodiment, the sealing member forming apparatus has the same elements as those in FIG. 6, and thus a detailed descriptions of the same elements will be omitted.

Referring to 6, 7 and 11A, a plurality of display areas 200 having a pixel 110 is juxtaposed with one another. In this exemplary embodiment, three display areas 200 juxtaposed with one another will be described. The three display areas 200 are represented by a first display area 210, a second display area 220 and a third display area 230 in turn.

In this exemplary embodiment, the first display area 210 includes a first edge 211, a second edge 212, a third edge 213 and a fourth edge 214, the second display area 220 includes a first edge 221, a second edge 222, a third edge 223 and a fourth edge 224, and the third display area 230 includes a first edge 231, a second edge 232, a third edge 233 and a fourth edge 234.

The first edges 211, 221 and 231 of the first, second and third display areas 210, 220 and 230 are substantially parallel to each other. The second edges 212, 222 and 232 of the first, second and third display areas 210, 220 and 230 are adjacent to the first edges 211, 221 and 231, respectively. The third edges 213, 223 and 233 of the first, second and third display areas 210, 220 and 230 are substantially parallel to the first edges 211, 221 and 231, respectively. The fourth edges 214, 224 and 234 of the first, second and third display areas 210, 220 and 230 are substantially parallel to the second edges 212, 222 and 232.

In order to seal the first, second and third display areas 210, 220 and 230 using a sealing material having a band shape or a string shape, the control unit 400 generates a first control signal in response to position data with respect to the first, second, third and fourth edges of the first, second and third display areas 210, 220 and 230 detected by means of the position detector 330.

In this exemplary embodiment, the driving unit 320 adjusts a moving path of the dispenser 310 in response to the first control signal. The dispenser 310 applies the sealing material to a corner portion 211 a where the first edge 211 meets the fourth edge 214. The dispenser 310 sequentially applies the sealing material along the first, second and third edges 211, 212 and 213 of the first display area 210.

Then, the dispenser 310 changes a direction thereof between the first and second display areas 210 and 220, and applies the sealing material along the first, second and third edges 221, 222 and 223 of the second display area 220.

Again, the dispenser 310 changes a direction thereof between the second and third display areas 220 and 230, and applies the sealing material along the first, second and third edges 231, 232 and 233 of the third display area 230.

More specifically, the dispenser 310 may apply the sealing material along the first, second and third edges 211, 212 and 213 of the first display area 210, the first, second and third edges 221, 222 and 223 of the second display area 220, and the first, second and third edges 231, 232 and 233 of the third display area 230, thereby forming a first sealing part 260.

In FIG. 11A, white dots corresponding with the first sealing part 260 show the moving path of the dispenser 310 while the first sealing part 260 is formed.

Referring to FIG. 11B, the control unit 400 generates a second control signal in response to the position data with respect to the first, second, third and fourth edges of the first, second and third display areas 210, 220 and 230 detected by means of the position detector 330.

In this exemplary embodiment, the driving unit 320 adjusts a moving path of the dispenser 310 in response to the second control signal.

The dispenser 310 applies the sealing material proximate a corner portion 233a where the third edge 233 meets the fourth edge 234 of the third display area 230. The dispenser 310 forms the sealing material along the fourth edge 234 of the third display area 230, the fourth edge 224 of the second display area 220 and the fourth edge 214 of the first display area 210, thereby forming a second sealing part 270.

The second sealing part 270 intersects the first sealing part 260 at the corner portion 233a and the corner portion 211a.

In FIG. 10B, black dots shows the moving path of the dispenser 310 while the second sealing part 270 is formed.

Embodiment 10

Figure 12:
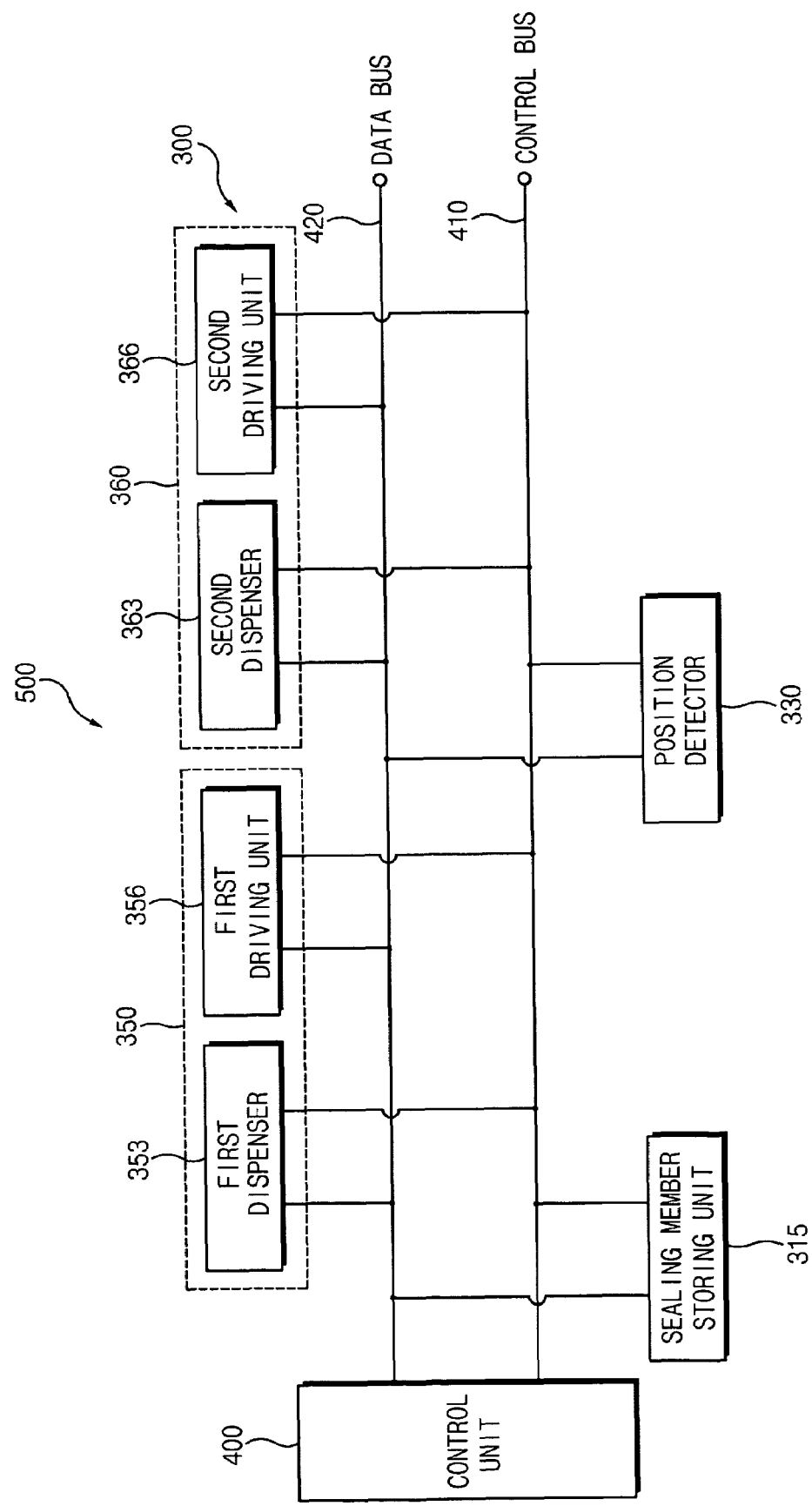
FIG. 12 is a block diagram showing a sealing member forming apparatus according to a tenth exemplary embodiment of the present invention.
Figure 13:
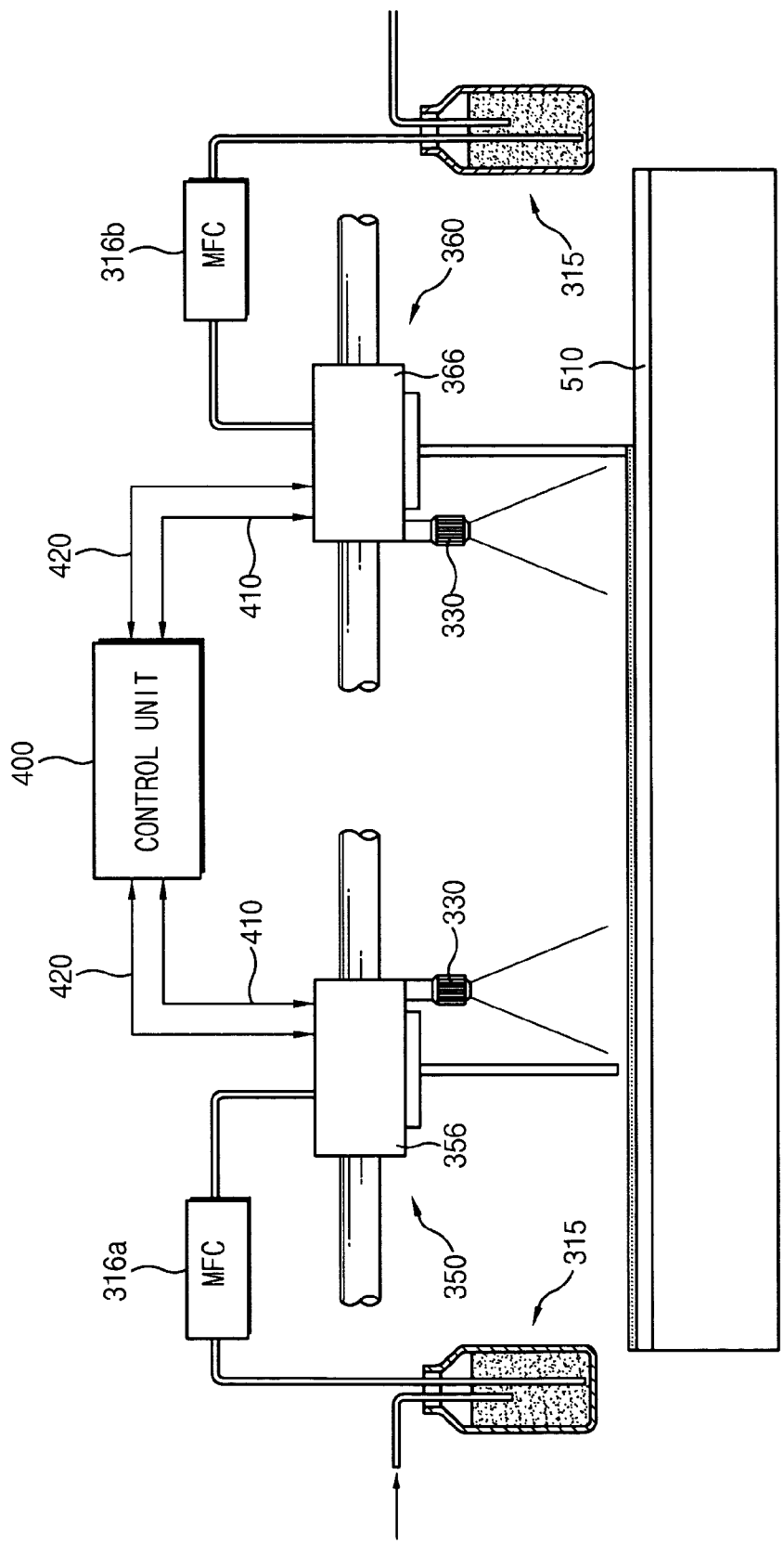
FIG. 13 is a schematic view showing the forming apparatus of a sealing member shown in FIG. 12.

FIG. 12 is a block diagram showing a sealing member forming apparatus according to a tenth exemplary embodiment of the present invention. FIG. 13 is a schematic view showing the forming apparatus of a sealing member shown in FIG. 12.

Referring to FIGS. 12 and 13, a sealing member forming apparatus 500 includes a sealing member coating unit 300 and a control unit 400.

The sealing member coating unit 300 includes a first sealing member coating unit 350 and a second sealing member coating unit 360.

The first sealing member coating unit 350 includes a first dispenser 353 and a first driving unit 356.

The first dispenser 310 discharges a sealing material having a band shape or a string shape onto a substrate 510 into which a display area is formed. The first driving unit 356 drives the first dispenser 353 over the substrate 510.

The first dispenser 353 receives a flowable sealing material from the sealing member storing unit 315. The sealing member storing unit 315 stores the sealing material and includes a first mass flow controller (MFC) 316a so as to supply the stored sealing material to the first dispenser 353 by a predetermined mass.

In this exemplary embodiment, the first driving unit 356 is an XY table for driving the first dispenser 353. In order to adjust an interval between the substrate 510 and the first dispenser 353, the first driving unit 356 may further include a vertical transfer unit (not shown) that transfers the first dispenser 353 in a substantially vertical direction with respect to an upper surface of the substrate 510.

The second sealing member coating unit 360 includes a second dispenser 363 and a second driving unit 366.

The second dispenser 363 supplies the sealing material having the band shape or the string shape onto the substrate 510. The second driving unit 366 drives the second dispenser 363 over the substrate 510.

The second dispenser 363 receives the flowable sealing material from the sealing member storing unit 315. The sealing member storing unit 315 stores the sealing material and includes a second mass flow controller (MFC) 316b so as to supply the stored sealing material to the second dispenser 363 by a predetermined mass.

In this exemplary embodiment, the second driving unit 366 is an XY table for driving the second dispenser 363. In order to adjust an interval between the substrate 510 and the second dispenser 363, the second driving unit 366 may further include a vertical transfer unit (not shown) that transfers the second dispenser 363 in a substantially vertical direction with respect to an upper surface of the substrate 510.

The sealing member coating unit 300 may further include a position detector 330 so as to precisely control the first and second driving units 356 and 366.

The position detector 330 detects an edge position of the display area formed on the substrate 510 and converts the edge position of the display area into a digital signal. In this exemplary embodiment, a charge-coupled device (CCD) camera is used as the position detector 330. Differently, the sealing member coating unit 300 may control the first and second driving units 356 and 366 based on measured data that is measured by a separate measuring instrument.

The position detector 330 may be applied to each of the first and second driving units 356 and 366, or installed at a position where the position detector 330 may photograph the entire substrate 510.

The control unit 400 generates a first control signal and a second control signal so as to precisely control the first and second driving units 356 and 366. Responsive to the first and second control signals from the control unit 400, the first and second driving units 356 and 366 controls positions of the first and second dispensers 353 and 356. The first and second dispensers 353 and 356 provide the sealing material having the band shape or the string shape onto a predetermined position of the substrate 510.

In this exemplary embodiment, the first driving unit 356 transfers the first dispenser 353 to a first direction along the edges of the display area formed on the substrate 510 in response to the first control signal from the control unit 400, thereby partially applying a first sealing part to the edges of the display area.

Also, the second driving unit 366 transfers the second dispenser 363 to a second direction opposite to the first direction in response to the second control signal from the control unit 400, thereby applying a second sealing part to the remaining edges of the display area.

The control unit 400 alternately applies the first and second control signals to the first and second driving units 356 and 366 so as to drive the first and second driving units 356 and 366.

When sealing the display area using the first and second dispensers 353 and 363, a time needed to seal the display area may be reduced by a half compared to that of when sealing the display area using one dispenser.

The control unit 400 may form the first and second sealing parts applied to the substrate 510 through various paths according to a number of the display areas.

Embodiment 11

Figure 14:
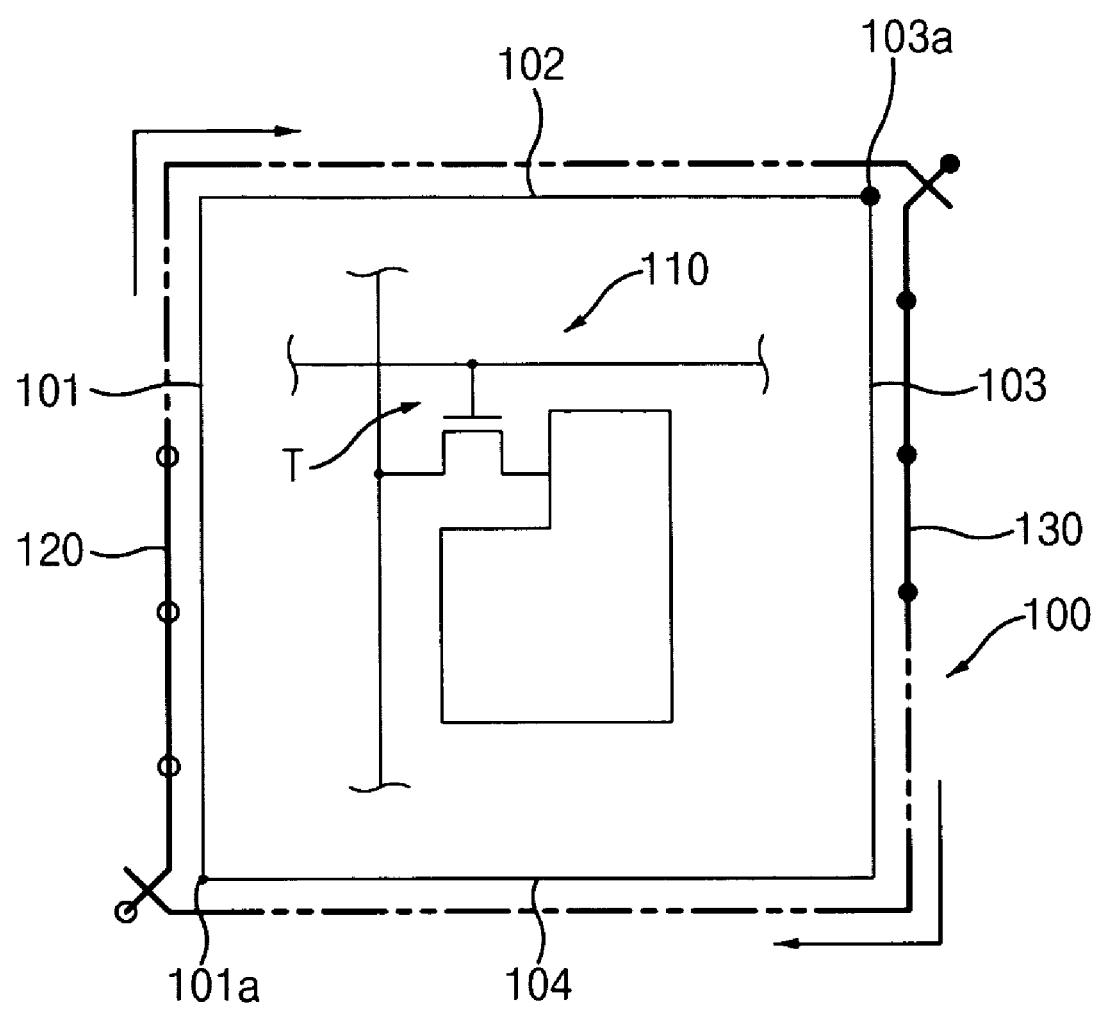
FIG. 14 is a plan view showing a sealing member formed by a first dispenser and a second dispenser according to an eleventh exemplary embodiment of the present invention.

FIG. 14 is a plan view showing a sealing member formed by a first dispenser and a second dispenser according to an eleventh exemplary embodiment of the present invention.

Referring to FIGS. 12 to 14, a display area 100 has a rectangular shape, so that the display area 100 includes a first edge 101, a second edge 102, a third edge 103 and a fourth edge 104. The first, second, third and fourth edges 101, 102, 103 and 104 are successively connected to each other. The first and second edges 101 and 102 face the third and fourth edges 103 and 104, respectively.

In order to partially seal the display area 100, the control unit 400 alternately generates the first and second control signals in response to the data provided from the position detector 330.

The first driving unit 356 operates in response to the first control signal. The first dispenser 353 applies the sealing material having the band shape or the string shape to a corner portion 101a where the first edge 101 meets the fourth edge 104. The first dispenser 353 forms the sealing material along the first and second edges 101 and 102 in a first direction.

The control unit 400 applies the second control signal to the second driving unit 366 while the first dispenser 353 forms the sealing material along the first and second edges 101 and 102 of the display area 100. The second dispenser 363 applies the sealing material having the band shape or the string shape generally at a corner portion 103a where the second edge 102 meets the third edge 103. The second dispenser 363 forms the sealing material along the third and fourth edges 103 and 104 in a second direction.

The control unit 400 alternately applies the first and second control signals to the first and second driving units 356 and 366. As a result, a first sealing part 120 is formed at a position adjacent to the first and second edges 101 and 102 of the display area 100, and a second sealing part 130 is formed at a position adjacent to the third and fourth edges 103 and 104 while the first sealing part 120 is formed.

Embodiment 12

Figure 15:
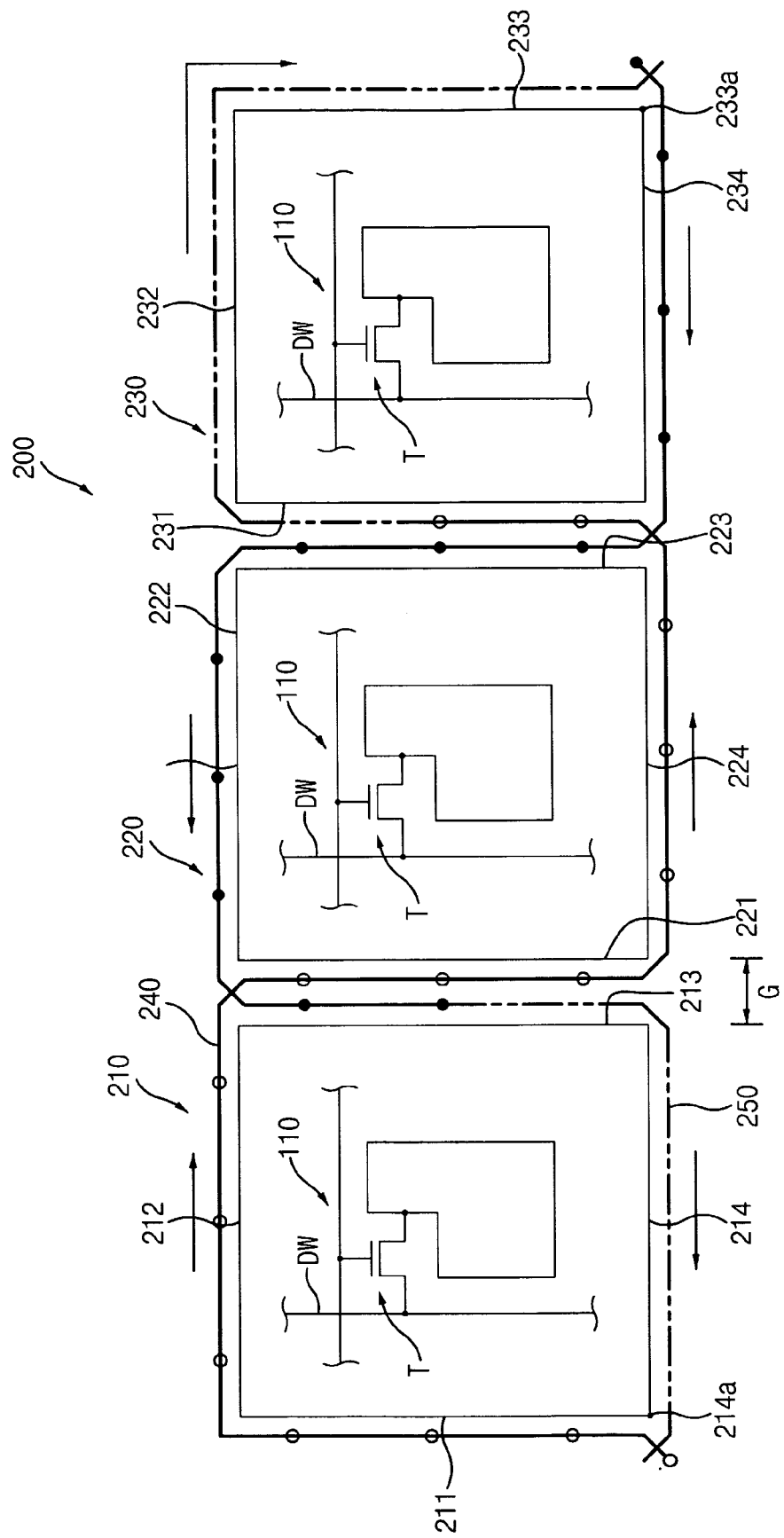
FIG. 15 is a plan view showing a sealing member formed by a first dispenser and a second dispenser according to an twelfth exemplary embodiment of the present invention.

FIG. 15 is a plan view showing a sealing member formed by a first dispenser and a second dispenser according to a twelfth exemplary embodiment of the present invention.

Referring to FIG. 15, a plurality of display areas 200 each having a pixel 110 is juxtaposed with one another. In this exemplary embodiment, three display areas 200 juxtaposed with one another will be described. The three display areas 200 are represented by a first display area 210, a second display area 220 and a third display area 230 in turn.

The first, second and third display areas 210, 220 and 230 are juxtaposed with one another so as to allow a data line DW disposed in each of the first, second and third displays 210, 220 and 230 to be juxtaposed with one another. Also, the first, second and third display areas 210, 220 and 230 are spaced apart from each other by an interval (G).

In this exemplary embodiment, the first display area 210 includes a first edge 211, a second edge 212, a third edge 213 and a fourth edge 214, the second display area 220 includes a first edge 221, a second edge 222, a third edge 223 and a fourth edge 224, and the third display area 230 includes a first edge 231, a second edge 232, a third edge 233 and a fourth edge 234.

The first edges 211, 221 and 231 of the first, second and third display areas 210, 220 and 230 are substantially parallel to each other. The second edges 212, 222 and 232 of the first, second and third display areas 210, 220 and 230 are adjacent to the first edges 211, 221 and 231, respectively. The third edges 213, 223 and 233 of the first, second and third display areas 210, 220 and 230 are substantially parallel to the first edges 211, 221 and 231, respectively. The fourth edges 214, 224 and 234 of the first, second and third display areas 210, 220 and 230 are substantially parallel to the second edges 212, 222 and 232.

Thus, the first edges 211, 221 and 231, the second edges 212, 222 and 232, the third edges 213, 223 and 233 and the fourth edges 214, 224 and 234 of the first, second and third display areas 210, 220 and 230 are sequentially connected to each other.

In order to seal the first edges 211, 221 and 231, the second edges 212, 222 and 232, the third edges 213, 223 and 233 and the fourth edges 214, 224 and 234 of the first, second and third display areas 210, 220 and 230, the control unit 400 alternately generates a first control signal and a second control signal in response to data provided from the position detector 330.

The first driving unit 356 controls a position of the first dispenser 353 in response to the first control signal. The first dispenser 353 applies the sealing material having the band shape or the string shape to a corner portion 214a where the first edge 101 meets the fourth edge 104 of the first display area 210. The first dispenser 353 forms the sealing material along the first edge 211.

Successively, the first dispenser 353 forms the sealing material along the second edge 212 of the first display area 210, the first and fourth edges 221 and 224 of the second display area 220, and the first, second and third edges 231, 232 and 233 of the third display area 230. Thus, a first sealing part 240 is formed along the second edge 212 of the first display area 210, the first and fourth edges 221 and 224 of the second display area 220, and the first, second and third edges 231, 232 and 234 of the third display area 230.

The control unit 400 applies the second control signal to the second driving unit 366 while the first dispenser 353 forms the first sealing part 240.

The second dispenser 363 applies the sealing material having the band shape or the string shape to a corner portion 233a where the third edge 233 meets the fourth edge 234. The second dispenser 363 forms the sealing material along the fourth edge 234 of the third display area 230, the third and second edges 223 and 222 of the second display area 220, and the third and fourth edges 213 and 214 of the first display area 210.

In this exemplary embodiment, the first and second dispensers 353 and 363 are intersected with each other at least once, so that the sealing member forming apparatus must be designed so as not to mechanically disturb the first and second dispensers 353 and 363 each other.

In order to prevent the disturbance between the first and second dispensers 353 and 363, the first dispenser 353 may be transferred in a speed different from a speed of the second dispenser 363, or the first sealing part 240 may have a length different from that of the second sealing part 250.

Embodiment 13

Figure 16:
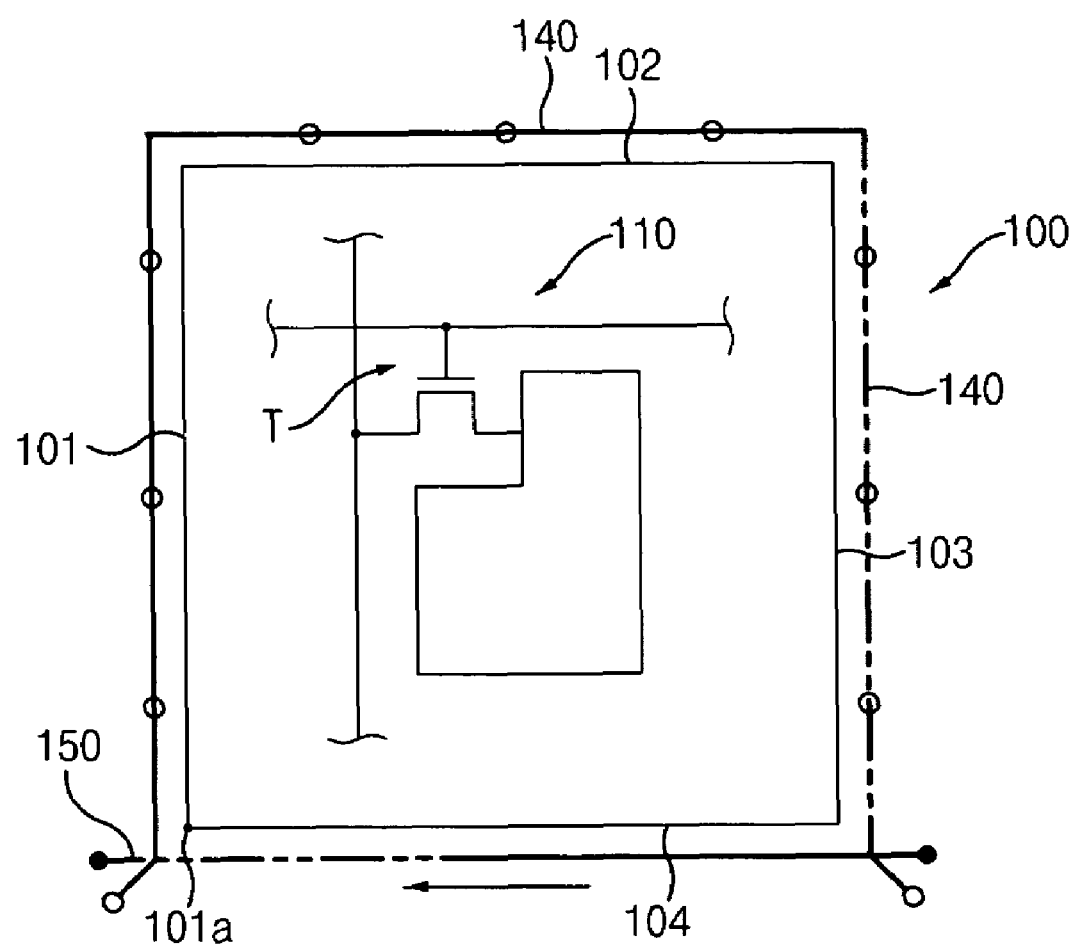
FIG. 16 is a plan view showing a sealing member formed by a first dispenser and a second dispenser according to an thirteenth exemplary embodiment of the present invention.

FIG. 16 is a plan view showing a sealing member formed by a first dispenser and a second dispenser according to a thirteenth exemplary embodiment of the present invention.

Referring to FIG. 16, a display area 100 has a rectangular shape, so that the display area 100 includes a first edge 101, a second edge 102, a third edge 103 and a fourth edge 104. The first, second, third and fourth edges 101, 102, 103 and 104 are successively connected to each other. The first and second edges 101 and 102 face the third and fourth edges 103 and 104, respectively.

In order to partially seal the display area 100, the control unit 400 alternately generates the first and second control signals in response to the data provided from the position detector 330.

The first driving unit 356 operates in response to the first control signal. The first dispenser 353 applies the sealing material having the band shape or the string shape to a corner portion 101a where the first edge 101 meets the fourth edge 104. The first dispenser 353 forms the sealing material along the first, second and third edges 101, 102 and 103 in a first direction. Thus, a first sealing part 140 is formed along the first, second and third edges 101, 102 and 103.

The control unit 400 applies the second control signal to the second driving unit 366 while the first dispenser 353 forms the first sealing part 140. The second dispenser 363 applies the sealing material having the band shape or the string shape along the fourth edge 104, thereby forming a second sealing part 150.

The first and second sealing parts 140 and 150 seal the display area 100.

Embodiment 14

Figure 17:
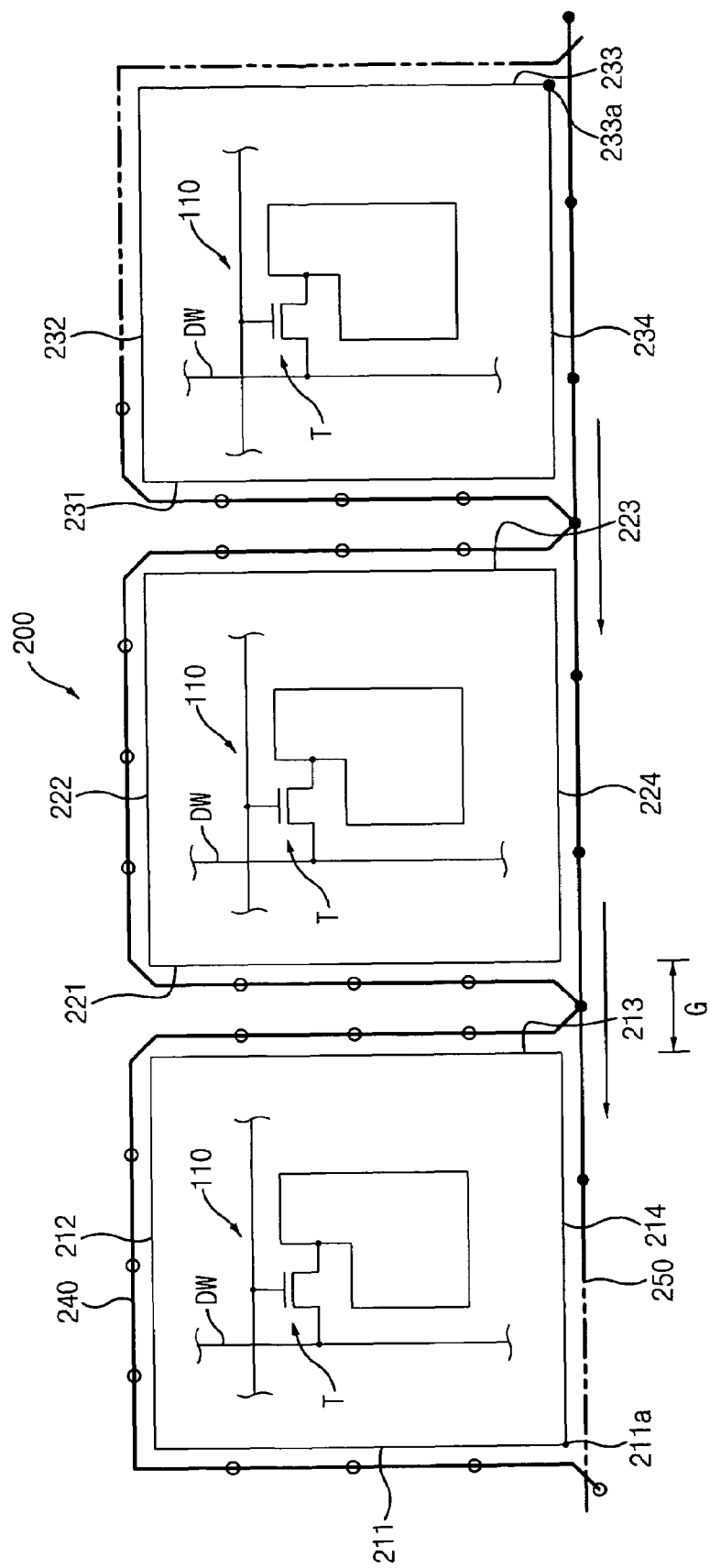
FIG. 17 is a plan view showing a sealing member formed by a first dispenser and a second dispenser according to a fourteenth exemplary embodiment of the present invention.

FIG. 17 is a plan view showing a sealing member formed by a first dispenser and a second dispenser according to a fourteenth exemplary embodiment of the present invention.

Referring to FIG. 17, a plurality of display areas 200 each having a pixel 110 is juxtaposed with one another. In this exemplary embodiment, three display areas 200 juxtaposed with each other will be described. The three display areas 200 are represented by a first display area 210, a second display area 220 and a third display area 230 in turn.

The first, second and third display areas 210, 220 and 230 are juxtaposed with one another so as to allow a data line DW disposed in each of the first, second and third displays 210, 220 and 230 to be juxtaposed with one another. Also, the first, second and third display areas 210, 220 and 230 are spaced apart from each other by an interval (G).

In this exemplary embodiment, the first display area 210 includes a first edge 211, a second edge 212, a third edge 213 and a fourth edge 214, the second display area 220 includes a first edge 221, a second edge 222, a third edge 223 and a fourth edge 224, and the third display area 230 includes a first edge 231, a second edge 232, a third edge 233 and a fourth edge 234.

The first edges 211, 221 and 231 of the first, second and third display areas 210, 220 and 230 are substantially parallel to each other. The second edges 212, 222 and 232 of the first, second and third display areas 210, 220 and 230 are adjacent to the first edges 211, 221 and 231, respectively. The third edges 213, 223 and 233 of the first, second and third display areas 210, 220 and 230 are substantially parallel to the first edges 211, 221 and 231, respectively. The fourth edges 214, 224 and 234 of the first, second and third display areas 210, 220 and 230 are substantially parallel to the second edges 212, 222 and 232.

Thus, the first edges 211, 221 and 231, the second edges 212, 222 and 232, the third edges 213, 223 and 233 and the fourth edges 214, 224 and 234 of the first, second and third display areas 210, 220 and 230 are sequentially connected to each other.

In order to seal the first edges 211, 221 and 231, the second edges 212, 222 and 232, the third edges 213, 223 and 233 and the fourth edges 214, 224 and 234 of the first, second and third display areas 210, 220 and 230, the control unit 400 alternately generates a first control signal and a second control signal in response to data provided from the position detector 330.

The first driving unit 356 controls a position of the first dispenser 353 in response to the first control signal. The first dispenser 353 applies the sealing material having the band shape or the string shape to a corner portion 211a where the first edge 211 meets the fourth edge 214 of the first display area 210.

The first dispenser 353 forms the sealing material along the first, second and third edges 211, 212 and 213 of the first display area 210, the first, second and third edges 221, 222 and 223 of the second display area 220, and the first, second and third edges 231, 232 and 233 of the third display area 230, thereby forming a first sealing part 240.

The control unit 400 applies the second control signal to the second driving unit 366 while the first dispenser 353 forms the first sealing part 240.

The second dispenser 363 applies the sealing material having the band shape or the string shape to a corner portion 233a where the third edge 233 meets the fourth edge 234 of the third display area 230. The second dispenser 363 forms the sealing material along the fourth edge 234 of the third display area 230, the fourth edge 224 of the second display area 220, and the fourth edge 214 of the first display area 210, thereby forming a second sealing part 250.

Display Apparatus

Embodiment 15

Figure 18:
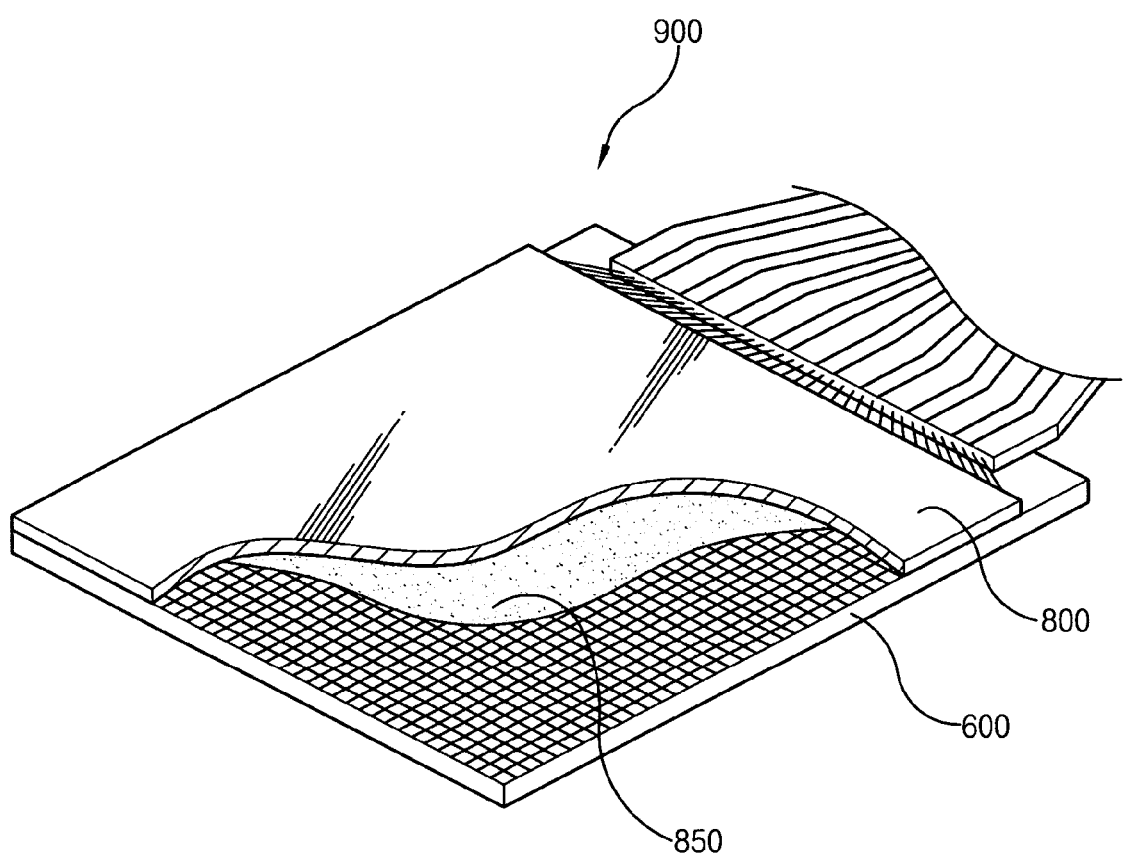
FIG. 18 is a partially cut perspective view showing a display apparatus according to a fifteenth exemplary embodiment of the present invention.
Figure 19:
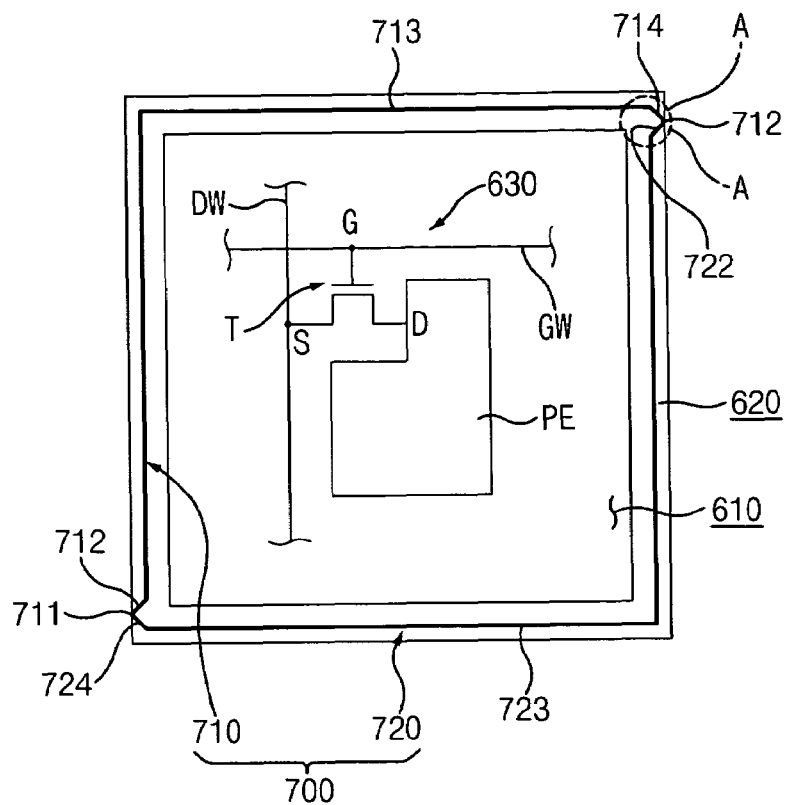
FIG. 19 is a plan view showing a second substrate shown in FIG. 18.

FIG. 18 is a partially cut perspective view showing a display apparatus according to a fifteenth exemplary embodiment of the present invention. FIG. 19 is a plan view showing a second substrate shown in FIG. 18.

Referring to FIG. 18, a display apparatus 900 includes a first substrate 600 and a second substrate 800. The display apparatus 900 may further include liquid crystal 850 interposed between the first and second substrates 600 and 800.

Referring to FIG. 19, the first substrate 600 includes a first display area 610 and a first peripheral area 620 that surrounds the first display area 610.

The first display area 610 includes a pixel 630 formed therein. The first substrate 600 may include a plurality of pixels according to a resolution of an image displayed on the first display area 610.

In a case where the resolution of the image is 640×480, the first display area 610 includes pixels of 640×480×3 units.

Each of the pixels 630 includes a pixel electrode (PE), a thin film transistor (T), a gate signal line (GW) and a data signal line (DW).

In a case where a display apparatus has a resolution of 640×480, the display apparatus includes pixel electrodes (PE) of 640×480×3 units, each of the pixel electrodes (PE) includes the thin film transistor (T), and a drain electrode (D) of each of the thin film transistors (T) is electrically connected to the pixel electrode (PE). The gate signal line (GW) is electrically connected to a gate electrode (G) of the thin film transistor (T). The data signal line (DW) is electrically connected to a source electrode (S) of the thin film transistor (T).

The sealing member 700 is formed along the first peripheral area 620, and includes a first sealing member 710 and a second sealing member 720.

The first sealing member 710 is applied to a portion of the first peripheral area 620. The first sealing member 710 includes a first connection portion 712, a first sealing portion 713 and a second connection portion 714. The first sealing portion 713 is formed along the first peripheral area 620 and substantially parallel to an edge of the first display area 610.

The first sealing portion 713 partially seals the first display area 610. The first connection portion 712 extends from a first end of the first sealing portion 713 to an exterior of the first peripheral area 620. The second connection portion 714 also extends from a second end of the first sealing portion 713 to an exterior defining the first peripheral area 620.

The second sealing member 720 includes a third connection portion 722, a second sealing portion 723 and a fourth connection portion 724. The second sealing portion 723 is formed along the first display area 610 and substantially parallel to the first display area 610.

The second sealing portion 723 seals a remaining portion of the first display area 610. The third connection portion 722 is extended from a first end of the second sealing portion and connected to the first connection portion 712. The fourth connection portion 724 is extended from a second end of the second sealing portion 723 and connected to the second connection portion 714.

Figure 20:
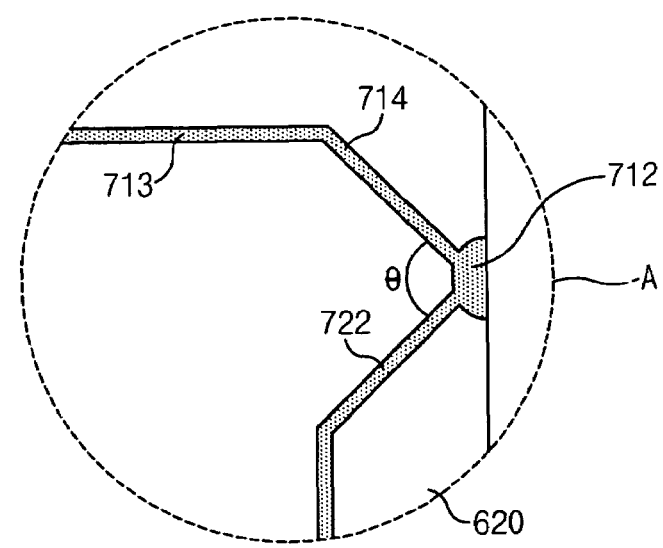
FIG. 20 is an enlarged view showing an "A" portion of FIG. 19.

FIG. 20 is an enlarged view showing an "A" portion of FIG. 19.

Referring to FIG. 20, an angle (θ) between the second and third connection portions 714 and 722 is greater than zero and smaller than 180 degrees. An angle (θ) between the first and fourth connection portions 712 and 724 is also greater than zero degree and smaller than 180 degrees.

A width at a position where the second and third connection portions 714 and 722 are connected to each other is wider than those of the first and second sealing portions 713 and 720. Also, a width at a position where the first and fourth connection portions 712 and 724 are connected to each other is wider than those of the first and second sealing portions 713 and 720.

Referring to FIG. 18, the second substrate 800 faces the first substrate 600. The second substrate 800 further includes a color filter formed at a position corresponding to the pixel electrode (PE) and a common electrode that covers the color filter. The liquid crystal 850 is interposed between the first and second substrates 600 and 800, and the sealing member 700 prevents the liquid crystal 850 from being leaked.

Manufacturing Method of Display Apparatus

Embodiment 16

FIG. 21A is a plan view illustrating a first method of forming a sealing member onto a first mother substrate according to a sixteenth exemplary embodiment of the present invention.

Referring to FIG. 21A, a plurality of first display areas 200 is formed on a first mother substrate 1000. Each of the first display areas 200 includes a plurality of pixels 110.

When the first display areas 200 are formed on the first mother substrate 1000, a sealing member 1100 is formed so as to separately seal each of the first display areas 200.

In this exemplary embodiment, a process that forms the sealing member 1100 may be divided into a process that forms a first sealing part 1110 and a process that forms a second sealing part 1120.

In order to form the first sealing part 1110, a sealing material having a band shape or a string shape is formed in a zigzag shape along spaces between the first display area

200 arranged in a first row in FIG. 21A. Thus, each of the first display areas 200 is partially sealed by the first sealing part 1110.

When a portion of the first display area 200 arranged in an nth column in FIG. 21A is sealed by the second sealing part 1120, the sealing material having the band shape or the string shape is formed in the zigzag shape from the first display area 200 arranged in the nth column to the first display area 200 arranged in the first column, thereby sealing a remaining portion of the first display area 200.

Figure 21B:
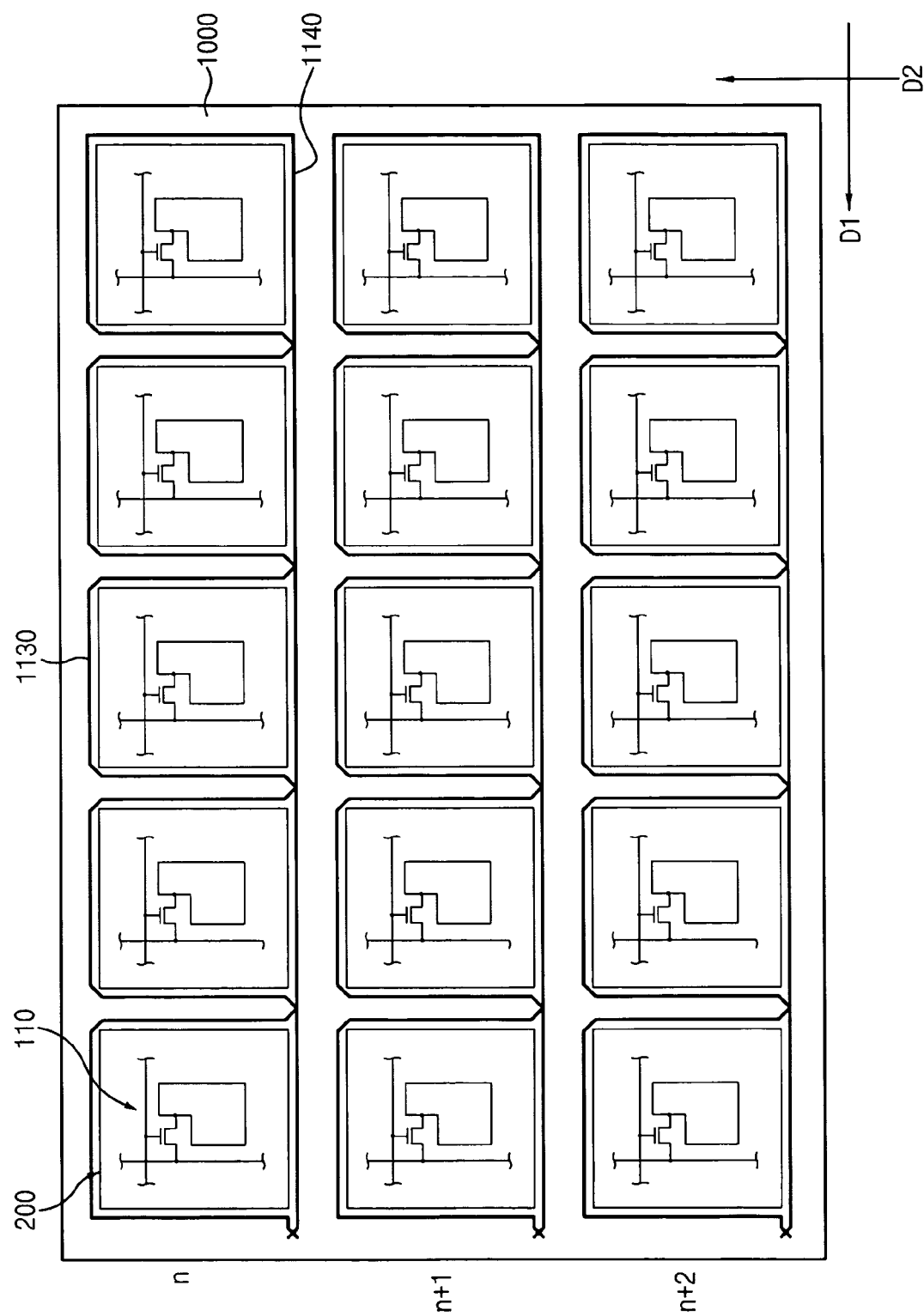
FIG. 21B is a plan view illustrating a second method of forming a sealing member onto a first mother substrate according to a sixteenth exemplary embodiment of the present invention.

FIG. 21B is a plan view illustrating a second method of forming a sealing member onto a first mother substrate 1000 according to a sixteenth exemplary embodiment of the present invention.

Referring to FIG. 21B, the first sealing part 1130 repeats go-and-return operation between the first display area and an adjacent first display area, so that the first sealing part 1130 is formed in a pulse shape from the first display area arranged in the first column to the first display area arranged in the nth column. The second sealing part 1140 is formed in a straight-line shape extended from the first display area arranged in the nth column to the first display area arranged in the first column. The second sealing part 1140 intersects with the first sealing part 1130 that seals each of the first display areas.

FIG. 21C is a plan view showing a second mother substrate according to the sixteenth exemplary embodiment of the present invention.

Referring to FIG. 21C, the second mother substrate 1200 faces the first mother substrate 1100. The second mother substrate 1200 includes a second display area 200a on which the common electrode is formed. The second mother substrate 1200 may further include a color filter and a black matrix formed before the common electrode is formed.

Figure 21D:
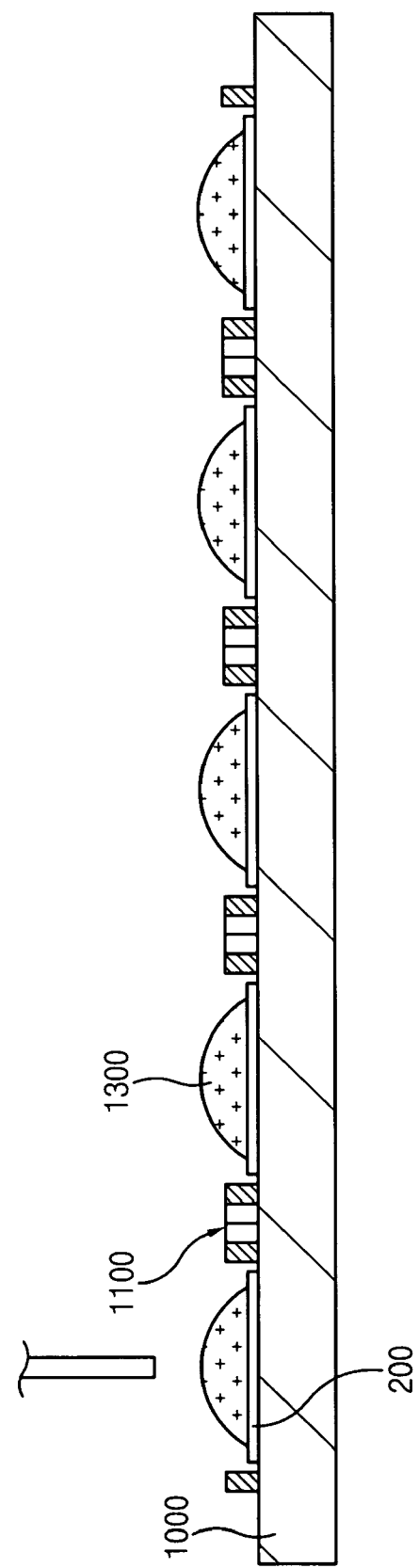
FIG. 21D is a cross-sectional view showing liquid crystal dropped onto the display area shown in FIG. 21A.

FIG. 21D is a cross-sectional view showing liquid crystal 1300 dropped onto the display area shown in FIG. 21 A.

Referring to FIG. 21D, after the first and second mother substrates 1100 and 1200 are fabricated, the liquid crystal is dropped into a sealing area sealed by the sealing member 1100.

Figure 21E:
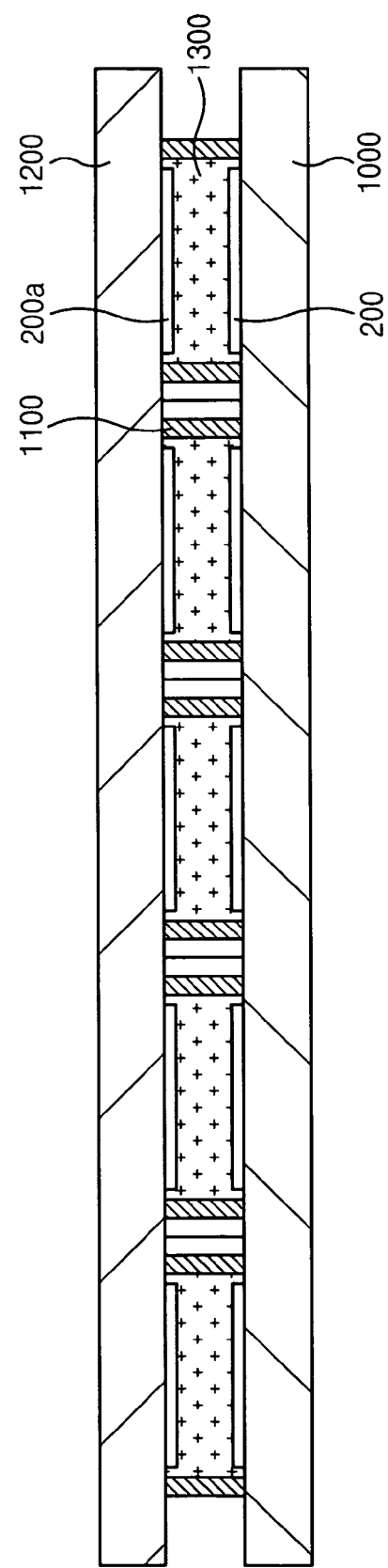
FIG. 21E is a cross-sectional view showing the first mother substrate assembled with the second mother substrate.

FIG. 21E is a cross-sectional view showing the first mother substrate assembled with the second mother substrate.

Referring to FIG. 21E, the first mother substrate 1000 where the liquid crystal 1300 is dropped onto is assembled with the second mother substrate 1200. The first display area 200 of the first mother substrate 1000 faces the second display area 200a of the second mother substrate 1200. Hereinafter, the first and second display areas 200 and 200a are defined as an LCD unit cell.

Figure 21F:
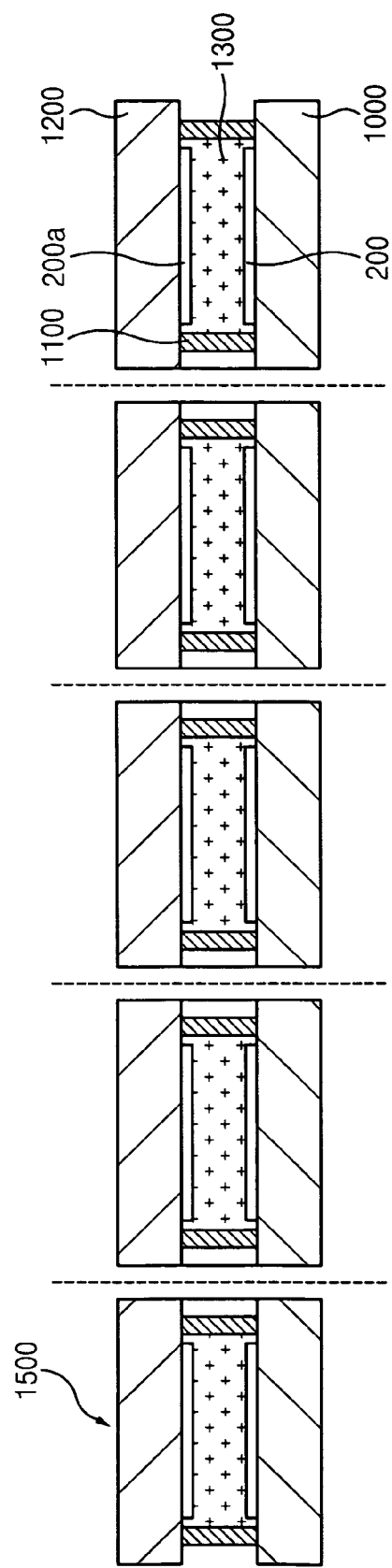
FIG. 21F is a cross-sectional view showing the first and second mother substrate cut into an LCD unit cell.

FIG. 21F is a cross-sectional view showing the first and second mother substrates 1000, 1200 cut into an LCD unit cell.

Referring to FIG. 21F, each of the LCD unit cells formed on the first and second mother substrates 1000 and 1200 is cut by means of a laser cutter or a diamond cutter, thereby manufacturing a display apparatus 1500.

According to the exemplary embodiments of the present invention, the time needed to form the sealing member that seals the liquid crystal may be reduced, since processes such as a vacuum process, hot press process, or end seal process, may be omitted. Further, an area needed to form the sealing member may be reduced, thereby enhancing productivity of the display apparatus. The area needed to form the sealing member may be reduced since the above described process facilitates forming successive seal lines.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method for forming a sealing member, the method comprising:

forming a first sealing part to surround one portion of a display area by a dispensing method, the display area including a pixel; and forming a second sealing part to surround a remaining portion of the display area and to intersect ends defining the second sealing part with corresponding ends defining the first sealing part thereby forming an X-shape by the dispensing method, wherein a first portion of the first and second sealing parts corresponding to a first side of the display area is parallel with a second portion of the first and second sealing parts corresponding to a second side of the display area opposite to the first side, and a first direction in which the first portion is formed is opposite to a second direction in which the second portion is formed.

2. The method of claim 1, wherein the first and second sealing parts define a closed loop of sealing material.

3. The method of claim 1, wherein the forming first and second sealing parts include forming first and second sealing parts having a cross-section of at least one of a band shape and a string shape.

4. The method of claim 1, wherein the display area has a rectangular shape that includes a first edge, a second edge, a third edge and a fourth edge, the first and second edges face the third and fourth edges, respectively.

5. The method of claim 4, wherein the first sealing part is defined by a first end and a second end, the first sealing part extends from the first end along at least a portion of the first edge along the second edge to the second end extending to at least a portion of the third edge, the second sealing part is applied along any remaining portions of the third and fourth edges so that first and second ends defining the second sealing part intersect with respective first and second ends defining the first sealing part.

6. The method of claim 4, wherein the first sealing part is defined by a first end is formed proximate a first corner defined where the first and fourth edges meet with each other, the first sealing part defined by a second end extends to an opposite corner defined where the second and third edges meet with each other, the second sealing part is applied to the third and fourth edges so that first and second ends defining the second sealing part intersect with respective first and second ends defining the first sealing part.

7. The method of claim 1, wherein the ends defining the second sealing part and the corresponding ends defining the first sealing part intersect forming an X-shape.

8. The method of claim 1, wherein each pixel includes a pixel electrode, a thin film transistor, a gate signal line and a data signal line, the pixel electrode is electrically connected to a drain electrode of the thin film transistor, the gate signal line is electrically connected to a gate electrode of the thin film transistor, and the data signal line is electrically connected to a source electrode of the thin film transistor.

9. The method of claim 1, wherein the display apparatus includes one of a liquid crystal display (LCD), a plasma display panel (PDP).

10. The method of claim 9, wherein when the display apparatus is an LCD, the sealing member is configured to prevent leakage of liquid crystal from the display area; when the display apparatus is a PDP, the sealing member is configured to prevent operation gas that generates plasma from leaking from the display area.

* * * * *